(12) United States Patent
Broome et al.

(10) Patent No.: US 11,187,154 B2
(45) Date of Patent: *Nov. 30, 2021

(54) COMPOSITE SPRAY BARS

(71) Applicant: Woodward, Inc., Fort Collins, CO (US)

(72) Inventors: Mark Allen Broome, Holland, MI (US); Seth E. Rutan, Holland, MI (US); Mark G. Goeddeke, West Olive, MI (US)

(73) Assignee: Woodward, Inc., Fort Collins, CO (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/352,321

(22) Filed: Mar. 13, 2019

(65) Prior Publication Data

US 2020/0095937 A1 Mar. 26, 2020

Related U.S. Application Data

(60) Provisional application No. 62/736,367, filed on Sep. 25, 2018.

(51) Int. Cl.
*F02C 7/22* (2006.01)
*B05B 1/20* (2006.01)
(Continued)

(52) U.S. Cl.
CPC .............. *F02C 7/222* (2013.01); *B05B 1/02* (2013.01); *B05B 1/14* (2013.01); *B05B 1/20* (2013.01);
(Continued)

(58) Field of Classification Search
CPC .... B05B 1/02; B05B 1/14; B05B 1/20; B05B 1/205; F02C 7/222; F16L 9/19;
(Continued)

(56) References Cited

U.S. PATENT DOCUMENTS

2013/0247574 A1* 9/2013 Patel .................. F23K 5/06
60/734
2015/0176495 A1* 6/2015 Hawie .................. F02C 7/222
60/739

(Continued)

FOREIGN PATENT DOCUMENTS

EP 0916827 5/1999
EP 3081783 10/2016
(Continued)

OTHER PUBLICATIONS

International Search Report and Written Opinion in International Application No. PCT/US2019/052392, dated Dec. 12, 2019, 15 pages.

(Continued)

*Primary Examiner* — Steven J Ganey
(74) *Attorney, Agent, or Firm* — Fish & Richardson P.C.

(57) ABSTRACT

The subject matter of this specification can be embodied in, among other things, a fuel delivery component, a substantially rigid, unitary structure formed as a single piece of material, and at least a first seamless lumen defined by the unitary structure as a first loop.

14 Claims, 30 Drawing Sheets

(51) Int. Cl.
*B05B 1/02* (2006.01)
*B05B 1/14* (2006.01)
*F16L 9/19* (2006.01)
*B33Y 10/00* (2015.01)
*B33Y 80/00* (2015.01)

(52) U.S. Cl.
CPC ............... *B05B 1/205* (2013.01); *F16L 9/19* (2013.01); *F16L 9/20* (2013.01); *B33Y 10/00* (2014.12); *B33Y 80/00* (2014.12); *F05D 2220/323* (2013.01); *F05D 2230/30* (2013.01)

(58) Field of Classification Search
CPC .......... F16L 9/20; B33Y 10/00; B33Y 80/00; F05D 2220/323; F05D 2230/30
USPC ....... 239/423, 450, 536, 548, 550, 566, 750, 239/DIG. 13; 138/112–115, 117; 60/734, 60/739
See application file for complete search history.

(56) References Cited

U.S. PATENT DOCUMENTS

2016/0305667 A1* 10/2016 Wolfe .................... F23R 3/343
2018/0030842 A1    2/2018 Johnson et al.
2020/0011455 A1*  1/2020 Jonnalagadda ......... B21C 37/08
2020/0095936 A1    3/2020 Broome

FOREIGN PATENT DOCUMENTS

| | | |
|---|---|---|
| EP | 3171087 | 5/2017 |
| EP | 3324120 | 5/2018 |
| EP | 3361159 | 8/2018 |
| WO | WO2009148680 | 12/2009 |
| WO | WO2015048374 | 4/2015 |
| WO | WO2018049239 | 3/2018 |

OTHER PUBLICATIONS

International Search Report and Written Opinion in International Application No. PCT/US2019/052400, dated Dec. 12, 2019, 17 pages.
PCT International Preliminary Report on Patentability in International Appln. No. PCT/US2019/052392, dated Apr. 8, 2021, 8 pages.
PCT International Preliminary Report on Patentability in International Appln. No. PCT/US2019/052400, dated Apr. 8, 2021, 10 pages.

* cited by examiner

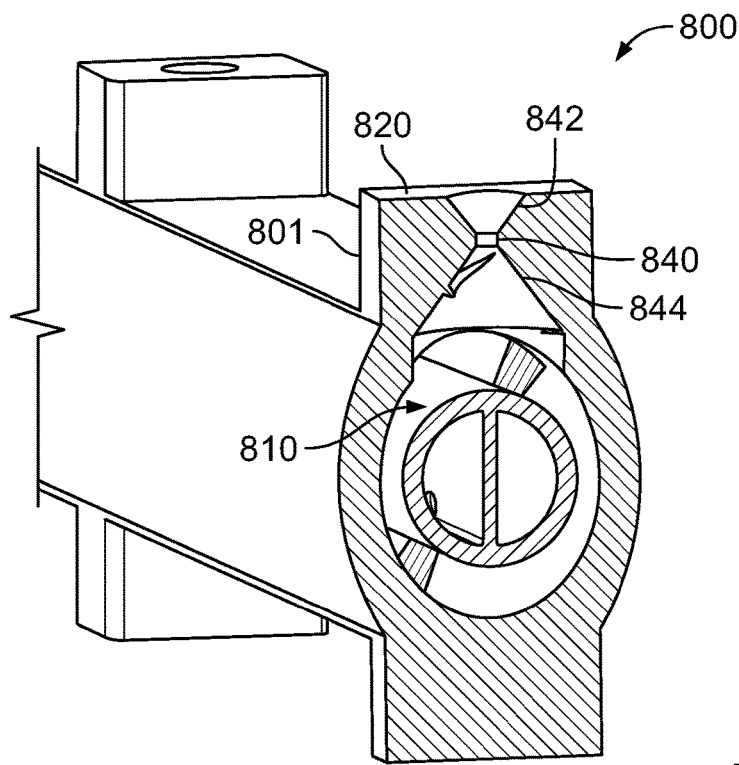
FIG. 8
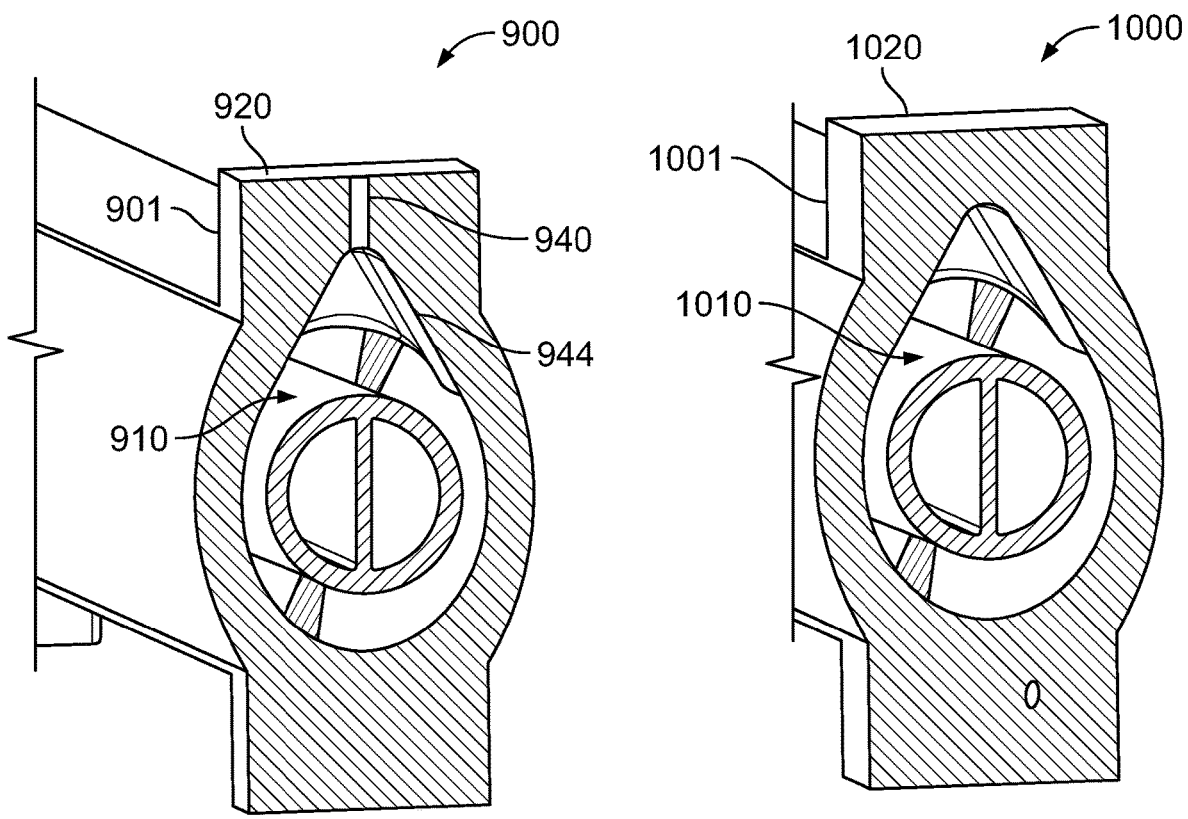
FIG. 9
FIG. 10

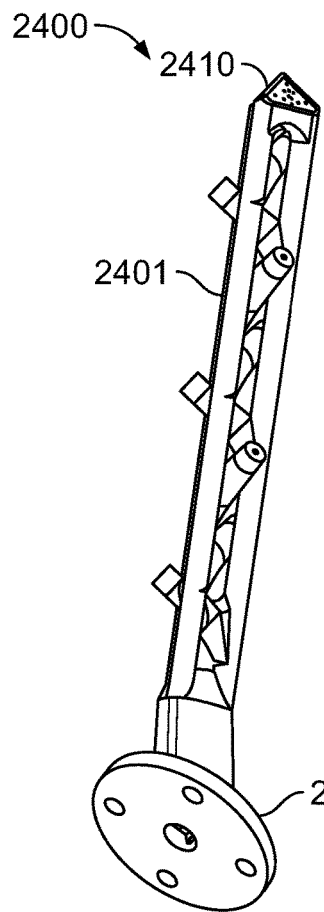 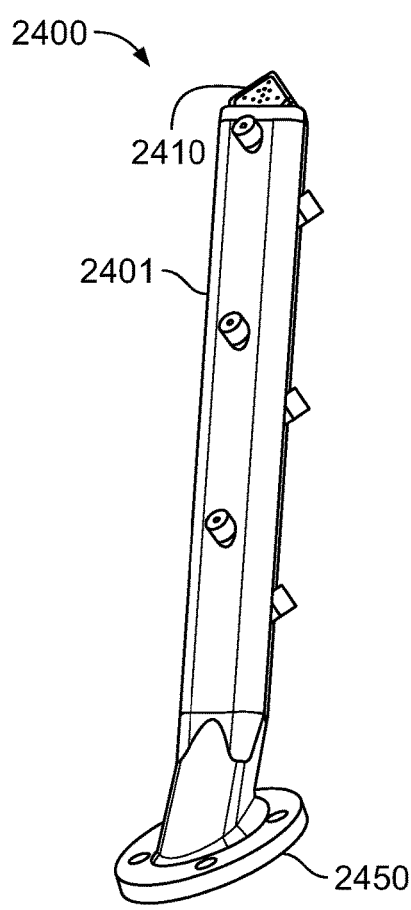 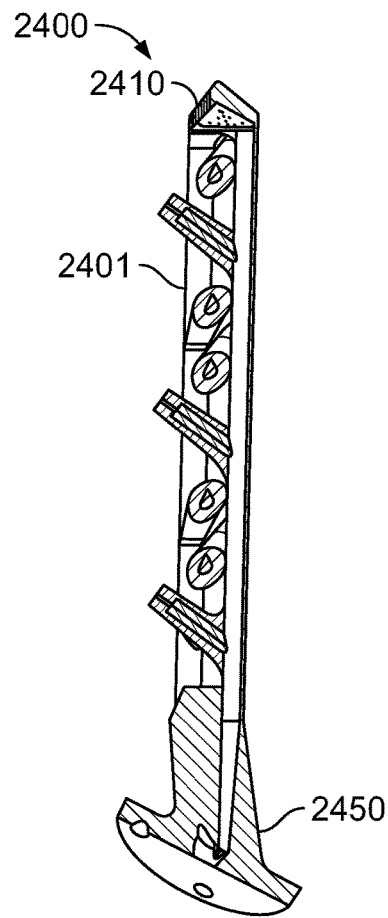
FIG. 24  FIG. 25  FIG. 26
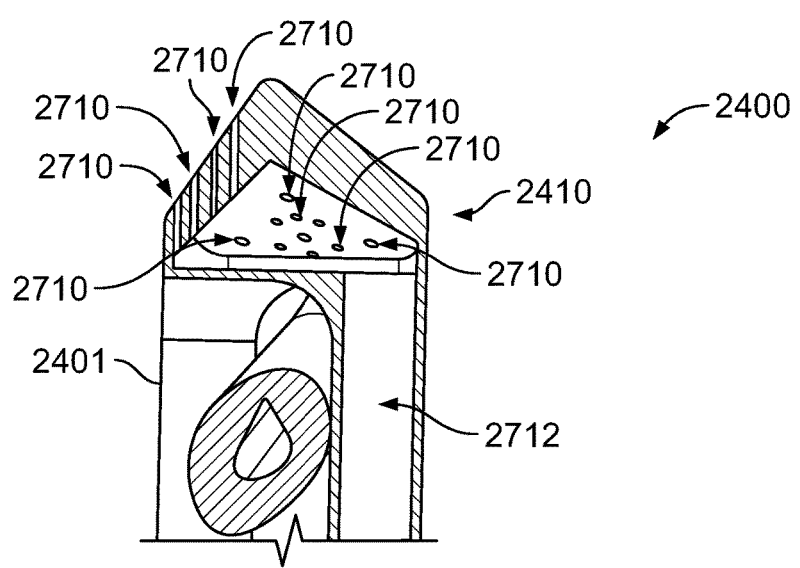
FIG. 27

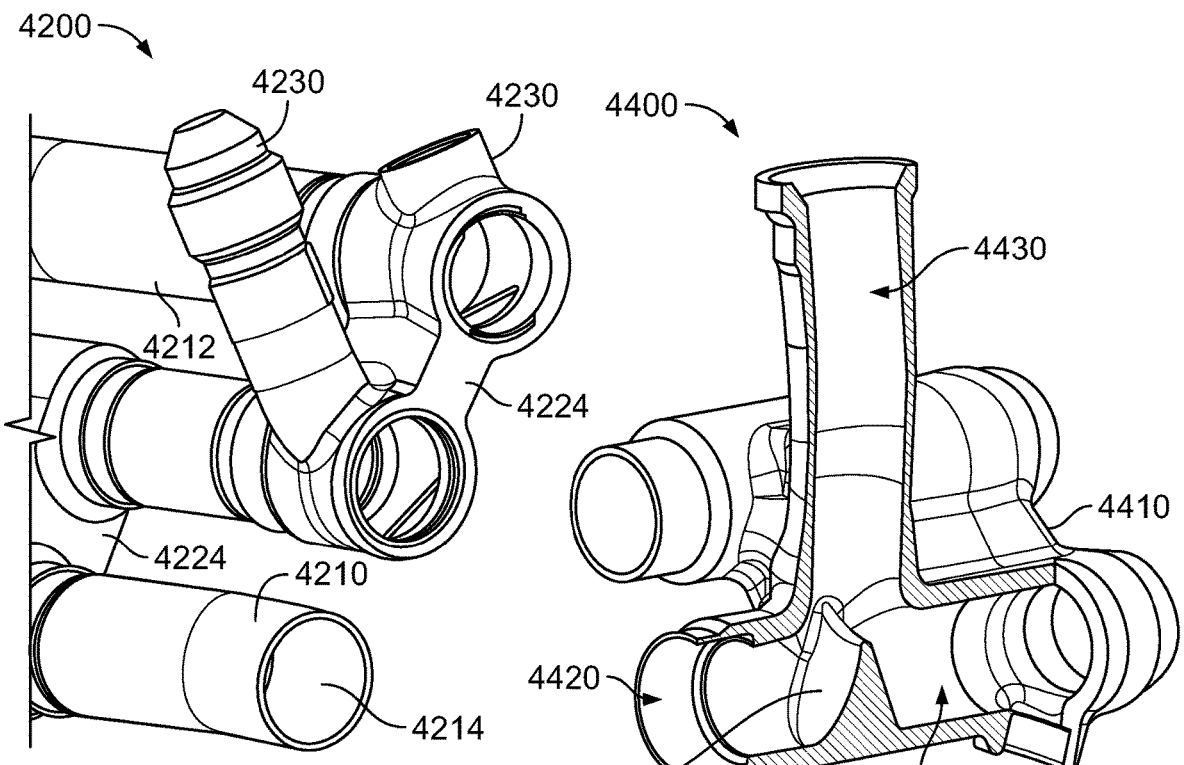
FIG. 43
FIG. 44
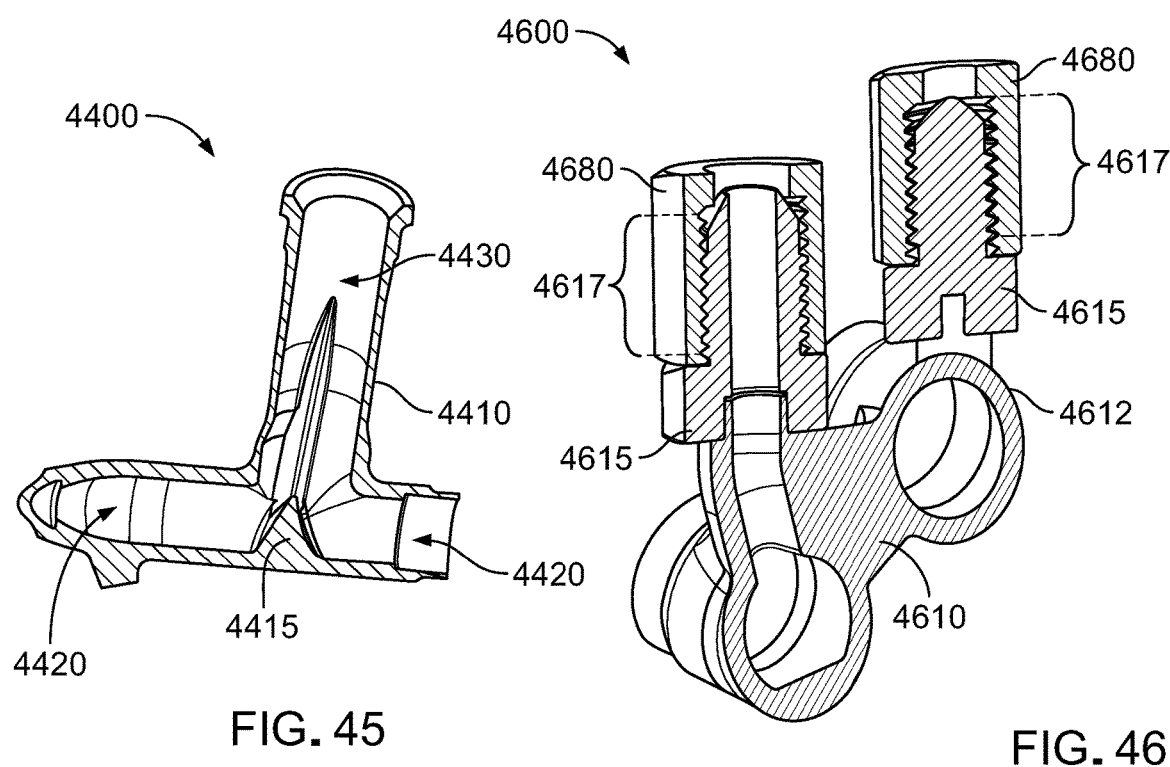
FIG. 45
FIG. 46

COMPOSITE SPRAY BARS

TECHNICAL FIELD

This instant specification relates to multi-lumen fuel distribution components.

BACKGROUND

A gas turbine engine may have a complex assembly of manifold tubes and machined components that deliver fuel to the spray bars or fuel nozzles, which inject the fuel into the combustor. Typically, these components are made up of a large number of individual machined components, which are assembled and permanently bonded together through welding or brazing. An example of this would be the manifold sub assembly of an afterburner for a turbofan jet engine.

Existing methods for manufacturing fuel manifolds require dozens of individual machined components to be assembled, and result in a large number of joints within the assembly. Such assemblies can be extremely complicated and difficult to produce, and as a result can be very expensive. Such assemblies may not optimized for fuel flow, and can require extensive external bracing for support and strengthening. In addition to this, the final assembly can be impractical to service. If any portion of the assembly requires replacement, the entire assembly is usually removed from the engine and returned to the manufacturer.

SUMMARY

In general, this document describes seamless, unitary, multi-lumen fuel distribution components.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a fuel delivery component, including a substantially rigid, unitary structure formed as a single piece of material, and at least a first seamless lumen defined by the unitary structure.

Various implementations may include some, all, or none of the following features. The fuel delivery component where the unitary structure can define the first seamless lumen to have a lengthwise radius of curvature. The fuel delivery component where the unitary structure can define the first seamless lumen to have a lengthwise varying cross-sectional area. The fuel delivery component can further include a second seamless lumen defined by the unitary structure, where the second seamless lumen is defined substantially parallel to the first seamless lumen. The fuel delivery component can further include a second seamless lumen defined by the unitary structure, where the first seamless lumen and the second seamless lumen are defined substantially helical relative to each other. The fuel delivery component can further include a second seamless lumen defined by the unitary structure at least partly within the first lumen. The fuel delivery component can further include a collection of support structures defined by the unitary structure along the lengths of the first seamless lumen and the second seamless lumen, and configured to position the first lumen relative to the second lumen. The collection of support structures can be discontinuous along the lengths of the first lumen and the second lumen. The fuel delivery component can further include a second seamless lumen and a third seamless lumen defined by the unitary structure and arranged as a non-intersecting weave with the first seamless lumen. The first seamless lumen can form a seamless loop. The fuel delivery component can further include at least one seamless fluid outlet defined by the unitary structure, where the fluid outlet defines a seamless outlet lumen in fluid communication with the first seamless lumen. The seamless fluid outlets can be configured at a fluid spray nozzle including a throat having a first cross-sectional area and including at least one of (1) a convergence taper defined between the seamless lumen and the throat and having a second cross-section that is larger than the first cross-section, and (2) a divergence taper defined between the throat and an outer face of the fluid outlet and having a third cross-section that is larger than the first cross-section. The fuel delivery component can further include one or more fluid connectors defined by the unitary structure, where each of the fluid connectors defines a seamless connecting lumen in fluid communication with one of the collection of seamless lumens.

Another general aspect includes a method of manufacturing a fuel delivery component, the method including forming, by additive manufacturing, a substantially rigid, unitary structure as a single piece of material, and defining, within the unitary structure, at least a first seamless lumen. Other embodiments of this aspect include corresponding computer systems, apparatus, and computer programs recorded on one or more computer storage devices, each configured to perform the actions of the methods.

Various implementations may include some, all, or none of the following features. The unitary structure can have a predetermined form. The first seamless lumen can be defined with a lengthwise radius of curvature. The first seamless lumen can be defined with a lengthwise varying cross-sectional area. The method can further include defining, within the unitary structure, a second seamless lumen that is arranged substantially parallel to the first seamless lumen. The method can further include defining, within the unitary structure, a second seamless lumen, where the first seamless lumen and the second seamless lumen are defined substantially helical relative to each other. The method can further include defining a second seamless lumen at least partly within the first lumen. The method can further include defining a collection of support structures defined by the unitary structure along the lengths of the first seamless lumen and the second seamless lumen, and configured to position the first lumen relative to the second lumen. The collection of support structures can be discontinuous along the lengths of the first lumen and the second lumen. The method can also include defining, within the unitary structure, a second seamless lumen, and defining, within the unitary structure, a third seamless lumen, where the first seamless lumen, the second seamless lumen, and the third seamless lumen can be arranged as a non-intersecting weave. The first seamless lumen can be defined as a seamless loop. The method can further include forming at least one seamless fluid outlet seamlessly formed of the unitary structure, where the seamless fluid outlet defines a seamless outlet lumen in fluid communication with the first seamless lumen. The method can further include forming at least one seamless fluid connector seamlessly formed of the unitary structure, where the seamless fluid connector defines a seamless connecting lumen in fluid communication with the first seamless lumen. Implementations of the described techniques may include hardware, a method or process, or computer software on a computer-accessible medium.

Another general aspect includes a fuel delivery component, including a substantially rigid, unitary structure formed as a single piece of material, and at least a first seamless lumen defined by the unitary structure as a first loop.

Various implementations may include some, all, or none of the following features. The unitary structure can define the first seamless lumen to have a lengthwise varying cross-sectional area. The fuel delivery component can further include a second seamless lumen defined by the unitary structure as a second loop, where the second seamless lumen is defined substantially parallel to the first seamless lumen. The fuel delivery component can further include a second seamless lumen defined by the unitary structure as a second loop, where the second seamless lumen is defined substantially coaxial to the first seamless lumen. The fuel delivery component can further include a second seamless lumen defined by the unitary structure as a second loop, where the first seamless lumen and the second seamless lumen are defined substantially helical relative to each other. The fuel delivery component can further include a second seamless lumen defined by the unitary structure as a second loop and a third seamless lumen defined by the unitary structure as a third loop, where the second seamless lumen and the third seamless lumen are arranged as a non-intersecting weave with the first seamless lumen. The fuel delivery component can further include a second seamless lumen defined by the unitary structure disposed at least partly within the first lumen. The fuel delivery component can further include a collection of support structures defined by the unitary structure along the lengths of the first seamless lumen and the second seamless lumen, and configured to position the first lumen relative to the second lumen. The collection of support structures can be discontinuous along the lengths of the first lumen and the second lumen. The fuel delivery component can further include at least one seamless fluid outlet defined by the unitary structure, where the fluid outlet defines a seamless outlet lumen in fluid communication with the first seamless lumen. The seamless fluid outlets can be configured as a fluid spray nozzle including a throat having a first cross-sectional area and including at least one of (1) a convergence taper defined between the seamless lumen and the throat and having a second cross-section that is larger than the first cross-section, and (2) a divergence taper defined between the throat and an outer face of the fluid outlet and having a third cross-section that is larger than the first cross-section. The fuel delivery component can further include one or more fluid connectors defined by the unitary structure, where each of the fluid connectors defines a seamless connecting lumen in fluid communication with one of the collection of seamless lumens.

Another general aspect includes a method of manufacturing a fuel delivery component, the method including forming, by additive manufacturing, a substantially rigid, unitary structure as a single piece of material, and defining, within the unitary structure, at least a first seamless lumen as a first loop. Other embodiments of this aspect include corresponding computer systems, apparatus, and computer programs recorded on one or more computer storage devices, each configured to perform the actions of the methods.

Various implementations may include some, all, or none of the following features. The unitary structure can have a predetermined form. The first seamless lumen can be defined with a lengthwise varying cross-sectional area. The method can further include defining, within the unitary structure, a second seamless lumen as a second loop, where the second seamless lumen is defined substantially parallel to the first seamless lumen. The method can further include defining, within the unitary structure, a second seamless lumen as a second loop, where the second seamless lumen is defined substantially coaxial to the first seamless lumen. The method can further include defining, within the unitary structure, a second seamless lumen as a second loop, where the first seamless lumen and the second seamless lumen are defined substantially helical relative to each other. The method can further include defining a second seamless lumen disposed at least partly within the first lumen. The method can further include defining a collection of support structures defined by the unitary structure along the lengths of the first seamless lumen and the second seamless lumen, and configured to position the first lumen relative to the second lumen. The collection of support structures can be discontinuous along the lengths of the first lumen and the second lumen. The method can further include defining, within the unitary structure, a second seamless lumen as a second loop, and defining, within the unitary structure, a third seamless lumen as a third loop, where the first seamless lumen, the second seamless lumen, and the third seamless lumen are arranged as a non-intersecting weave. The method can further include forming at least one seamless fluid outlet seamlessly formed of the unitary structure, where the seamless fluid outlet defines a seamless outlet lumen in fluid communication with the first seamless lumen. The method can further include forming at least one seamless fluid connector seamlessly formed of the unitary structure, where the seamless fluid connector defines a seamless connecting lumen in fluid communication with the first seamless lumen. Implementations of the described techniques may include hardware, a method or process, or computer software on a computer-accessible medium.

Another general aspect includes a fuel delivery component, including a substantially rigid, unitary structure formed as a single piece of material, and at least a first seamless lumen defined by the unitary structure as a first loop.

Various implementations may include some, all, or none of the following features. The unitary structure can define the first seamless lumen to have a lengthwise varying cross-sectional area. The fuel delivery component can further include a second seamless lumen defined by the unitary structure as a second loop, where the second seamless lumen is defined substantially parallel to the first seamless lumen. The fuel delivery component can further include a second seamless lumen defined by the unitary structure as a second loop, where the second seamless lumen is defined substantially coaxial to the first seamless lumen. The fuel delivery component can further include a second seamless lumen defined by the unitary structure as a second loop, where the first seamless lumen and the second seamless lumen are defined substantially helical relative to each other. The fuel delivery component can further include a second seamless lumen defined by the unitary structure as a second loop and a third seamless lumen defined by the unitary structure as a third loop, where the second seamless lumen and the third seamless lumen are arranged as a non-intersecting weave with the first seamless lumen. The fuel delivery component can further include a second seamless lumen defined by the unitary structure disposed at least partly within the first lumen. The fuel delivery component can further include a collection of support structures defined by the unitary structure along the lengths of the first seamless lumen and the second seamless lumen, and configured to position the first lumen relative to the second lumen. The collection of support structures can be discontinuous along the lengths of the first lumen and the second lumen. The fuel delivery component can further include at least one seamless fluid outlet defined by the unitary structure, where the fluid outlet defines a seamless outlet lumen in fluid communication with the first seamless lumen. The seamless fluid outlets can be configured as a fluid spray nozzle comprising a throat having a first cross-sectional area and comprising at least one of (1) a convergence taper defined between the seamless lumen and the throat and having a second cross-section that is larger than the first cross-section, and (2) a divergence taper defined between the throat and an outer face of the fluid outlet and having a third cross-section that is larger than the first cross-section. The fuel delivery component can further include one or more fluid connectors defined by the unitary structure, where each of the fluid connectors defines a seamless connecting lumen in fluid communication with one of the collection of seamless lumens.

Another general aspect includes a method of manufacturing a fuel delivery component, the method including forming, by additive manufacturing, a substantially rigid, unitary structure as a single piece of material, and defining, within the unitary structure, at least a first seamless lumen as a first loop.

Various implementations may include some, all, or none of the following features. The unitary structure can have a predetermined form. The first seamless lumen can be defined with a lengthwise varying cross-sectional area. The method can further include defining, within the unitary structure, a second seamless lumen as a second loop, where the second seamless lumen is defined substantially parallel to the first seamless lumen. The method can further include defining, within the unitary structure, a second seamless lumen as a second loop, where the second seamless lumen is defined substantially coaxial to the first seamless lumen. The method can further include defining, within the unitary structure, a second seamless lumen as a second loop, where the first seamless lumen and the second seamless lumen are defined substantially helical relative to each other. The method can further include defining a second seamless lumen disposed at least partly within the first lumen. The method can further include defining a collection of support structures defined by the unitary structure along the lengths of the first seamless lumen and the second seamless lumen, and configured to position the first lumen relative to the second lumen. The collection of support structures are discontinuous along the lengths of the first lumen and the second lumen. The method can further include defining, within the unitary structure, a second seamless lumen as a second loop, and defining, within the unitary structure, a third seamless lumen as a third loop, where the first seamless lumen, the second seamless lumen, and the third seamless lumen are arranged as a non-intersecting weave. The method can further include forming at least one seamless fluid outlet seamlessly formed of the unitary structure, where the seamless fluid outlet defines a seamless outlet lumen in fluid communication with the first seamless lumen. The method can further include forming at least one seamless fluid connector seamlessly formed of the unitary structure, where the seamless fluid connector defines a seamless connecting lumen in fluid communication with the first seamless lumen.

The systems and techniques described here may provide one or more of the following advantages. First, a system can provide fuel distribution components that are seamless. Second, the components can have a reduced likelihood of leakage. Third, the components can be structurally robust to withstand harsh environments. Fourth, the components can be produced with reduced cost. Fifth, the components can be built with inherent strengthening features that reduces the amount of space used by the component, reduced the amount of material used to make the component, reduces the weight of the component, and reduces the cost of the component. Fifth, the components can exhibit extended life and improved performance.

The details of one or more implementations are set forth in the accompanying drawings and the description below. Other features and advantages will be apparent from the description and drawings, and from the claims.

BRIEF DESCRIPTION OF DRAWINGS

FIG. 8 is a sectional view of an example spray orifice with conformal and directed flow supports.

FIG. 9 is a sectional view of an example spray orifice with conformal flow and directed flow.

FIG. 10 is a sectional view of an example spray orifice with helical orifice directed flow.

FIG. 24 is a perspective view of an example three-zone fountain spray bar assembly with angular fuel dispensing and separate tube support without heat shield.

FIG. 25 is a perspective view of an example three-zone fountain spray bar assembly with angular fuel dispensing, lattice tip, and base.

FIG. 26 is a perspective view of an example three-zone fountain spray bar assembly with angular fuel dispensing, lattice tip, and base.

FIG. 27 is an enlarged perspective view of an example three-zone fountain spray bar assembly with angular fuel, lattice tip, and base.

FIG. 43 is a sectional view of an example segmented manifold with conformal flow and removable features.

FIG. 44 is a sectional view of an example segmented manifold inlet flow divider.

FIG. 45 is a sectional view of an example segmented manifold inlet flow divider build support feature.

FIG. 46 is a sectional view of an example segmented manifold with conformal flow features and removable features.

DETAILED DESCRIPTION

This specification describes systems and techniques for the fabrication of fluid (e.g., fuel) delivery components having integral lumens (e.g., fluid passages). In general, jet engine fuel spray bars, jet engine fuel manifolds, and other types of fluid delivery components can have complex designs with complex combinations and arrangements of fluid passages, supports, inlets, outlets, mounting features, and other features.

Traditional manufacturing techniques such as machining, molding, and extruding are limited in their ability to create components having complex 3D geometries, especially those having complex internal geometries (e.g., lumens, cavities, discontinuities). As such, complex devices are traditionally made up of a great number of separately manufactured, simpler subcomponents that are welded or brazed together into a complex assembly. Some examples of traditional fuel manifolds manufactured using traditional techniques include nearly a hundred individual machined components, and result in a large number of joints and seams within the assembly. Such traditional assemblies can be extremely complicated and difficult to produce, and as a result can be very expensive. Such traditional assemblies may not be optimized for fuel flow, and may implement extensive external bracing for support and strengthening. In some embodiments, the final assembly can be impractical or impossible to service, such that if any portion of the assembly requires replacement the entire assembly must be removed from the engine and returned to the manufacturer in its assembled form.

The fluid delivery components discussed below are generally unitary (e.g., one-piece, made from a single piece of material without seams or joints), and can include complex internal and external structures that are impractical or impossible to form by traditional machining, molding, or extruding techniques. In general, the complexity of the components discussed below is made possible through the use of additive manufacturing (AM) techniques, such as 3D printing, binder jetting, photopolymerization, powder bed fusion, material jetting, sheet lamination, directed energy deposition, or any other appropriate form of AM. The use of AM is more than mere design choice; the use of AM enables the creation of components having internal and external geometries and features that were not previously available.

A three-dimensional (3D) fabricator, such as a powder bed fusion machine, is used to produce physical embodiments of complex computer models, forming one layer on top of another to create a physical model having complex 3D internal and external features.

Figure 1:
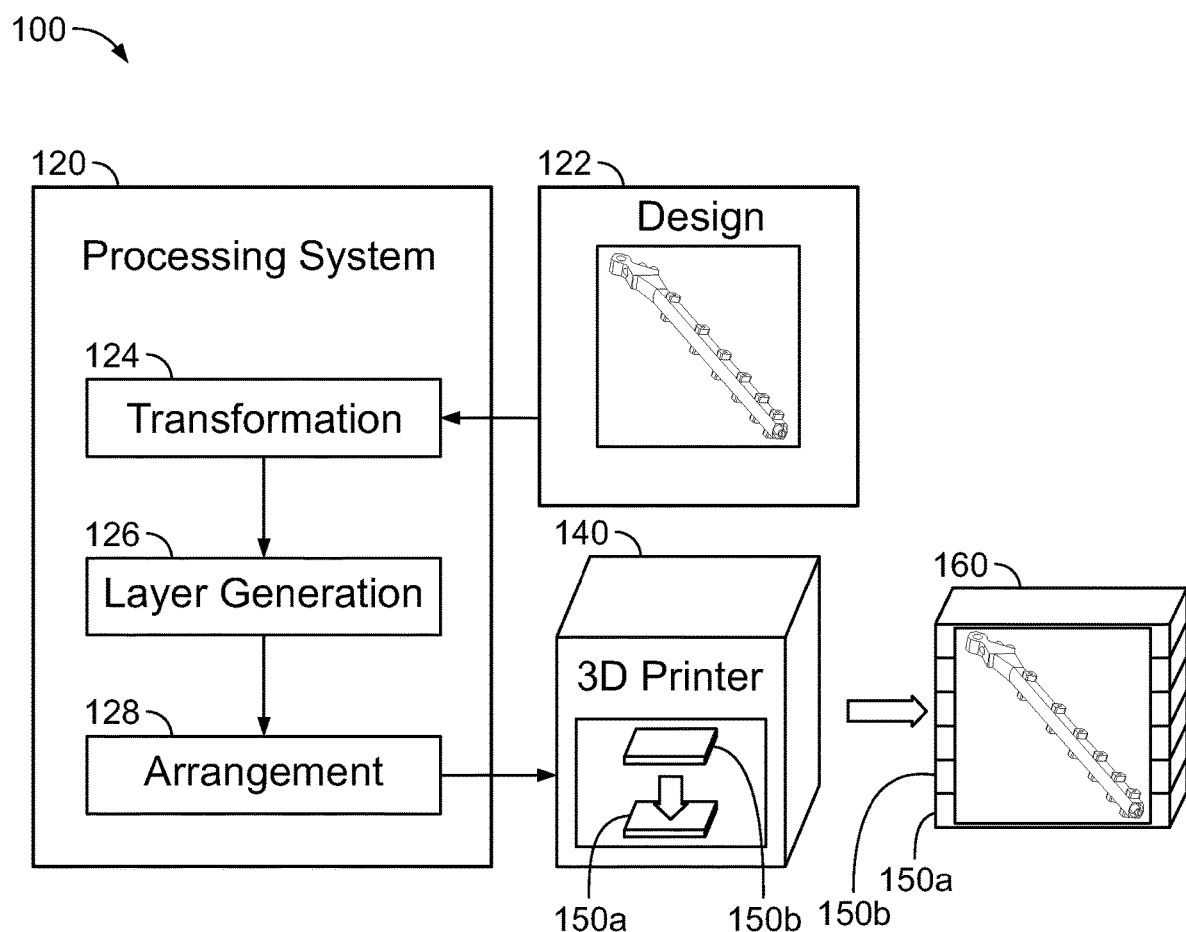
FIG. 1 is a schematic diagram that shows an example of a system for fabrication of seamless, unitary, multi-lumen fluid distribution components.

FIG. 1 is a schematic diagram that shows an example of a system 100 for fabrication of seamless, unitary, multi-lumen fluid distribution components. A design 122 (e.g., a computer model of a fluid delivery component) is provided to a processing system 120 for processing and transformation. For example, a design engineer can create a computer aided design (CAD) model of a spray bar or manifold, and save that model as an electronic file that can be read by the processing system 120 as the design 122.

The processing system 120 includes a transformation module 124. The transformation module 124 includes a computer-readable medium storing instructions executable by processors to perform operations. The transformation module 124 is configured to process the design 122 and determine a computer aided manufacturing (CAM) model of the design.

The CAM model is received by a layer generation module 126 to generate at collection of layer models that are representative of thin sections of the design 122. The layer generation module 126 includes a computer-readable medium storing instructions executable by processors to perform operations. Each layer model identifies a distribution fills and voids within the thin section it represents.

An arrangement module 128 arranges layer models into adjacent layers that, collectively, are emulative of the design 122. The arrangement module 128 includes a computer-readable medium storing instructions executable by processors to perform operations. For example, a first layer model and a second layer model can represent generally two-dimensional slices of a three-dimensional model, and the arrangement module 128 can arrange these slices to create the three-dimensional model. Since each of the layers has a 2D distribution of fills and voids, the resulting three-dimensional model can have a 3D distribution of fills and voids emulating that of the design 122.

In some implementations, the arrangement module 128 can arrange at least the first layer model and the second layer model as a 3D representation. Additional layers based on the design 122 can be added in a similar manner to create a 3D model of even greater combined thickness and complexity.

The system 100 also includes an additive manufacturing system 140 or other form of 3D fabricator. In the illustrated example, the AM system 140 is an additive manufacturing device for the formation of seamless, unitary physical, 3D objects, in which primarily additive processes may be used to lay down successive layers of material under computer control. In some embodiments, however, the AM system 140 can also include subtractive manufacturing (e.g., machining) capabilities, other deposition capabilities (e.g., stereolithography), erosive capabilities, extrusion capabilities, molding capabilities, or combinations of these and/or any other appropriate manufacturing processes.

The processing system 120 provides the first representation and the second representation to the AM system 140 for manufacturing as a fluid delivery component 160. The AM system 140 deposits a physical 3D layer 150*a* based on the first layer model and deposits a physical 3D layer 150*b* on top of the physical 3D layer 150*a*, based on the second layer model. In some implementations, additional layer models may be provided to the AM system 140 for deposition as additional layers to form the fluid delivery component 160.

In some implementations, the processing system 120 can provide the first layer model and the second layer model to the AM system 140 as the 3D model. For example, the processing system 120 can transform the design 122 into a collection of commands for the AM system 140. The processing system 120 may provide the entire collection of commands to the AM system 140, or the processing system 120 may stream subsets of the collection to the AM system 140, e.g., up to the capacity of a command buffer in the AM system 140.

In some implementations, the processing system 120 can provide the first layer model and the second layer model to the AM system 140 separately. For example, the processing system 120 can transform the first layer model into a collection of commands for the AM system 140, which the AM system 140 can deposit as the physical 3D layer 150*a*. The processing system 120 can then transform the second layer model into a collection of commands for the AM system 140, which the AM system 140 can deposit as the physical 3D layer 150*b* on top of the physical 3D layer 150*a*. In some implementations, there may be no need to provide more than one layer's worth of commands to the AM system 140 at a time, since previous layer models have already been formed as physical layers, and subsequent layer models may not be relevant to the manufacturing process until the current layer is complete.

Through the use of AM, the system 100 can produce parts with internal and external geometries that are impossible (e.g., due to tool limitations) or impractical (e.g., too slow, too expensive) to build using traditional machining techniques. In some embodiments, and as will be discussed in more detail below, the fluid delivery component 160 can have internal lumens (e.g., fluid ducts) having complex shapes, such as: serpentine, spiral, helical, intertwined, or interwoven (e.g., braided) lengthwise shapes, multiple intersecting and/or nonintersecting lumens, lumens with cross-sections that vary along their lengths, lumen walls that also function as internal supports, internal discontinuities, complex undercuts, integral fluid inlets and/or outlets, and any other appropriate fluid duct shape.

Figure 2:
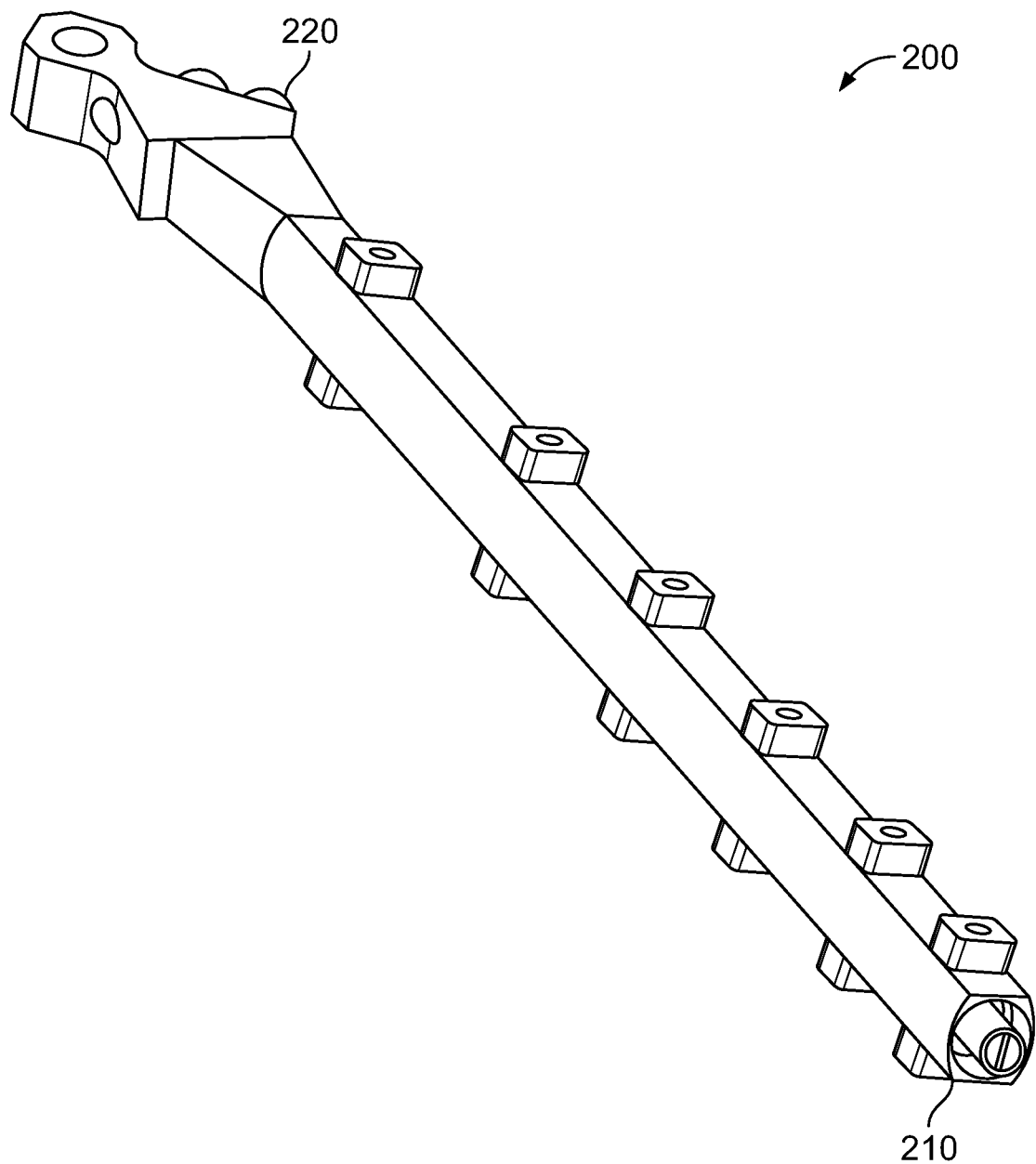
FIG. 2 is a perspective view of an example two-zone composite spray bar.

FIG. 2 is a perspective view of an example two-zone composite spray bar 200. In some embodiments, the spray bar 200 can be the example fluid delivery component 160 of FIG. 1. The spray bar 200 is a one-piece, unitary component formed as a single piece of material without seams or joints. The spray bar 200 includes an end 210 and a spray bar base 220, both formed integrally with the unitary material of the spray bar 200.

Generally speaking, the spray bar 200 is a single piece composite spray bar with multiple passages that are constructed of self-supporting geometry, including internal structures, which were previously impossible to produce as a single piece under conventional manufacturing methods. These passages may be a tube-in-tube design, intertwined tubes, or tubes that are stacked with respect to one another, utilizing self-supporting geometry to allow a build angle respective of the manufacturing equipment selected. The spray bar 200 can include internal features that can control and direct the flow of fluid through the passages in such a way as to control or prevent dead spaces, reduce coking potential by creating selective high velocity, high-pressure areas, and custom spray quality by controlling fluid distribution. The supports may also be used to diffuse flow, such as a lattice structure. In some embodiments, the internal geometry of the spray bar 200 may be designed to reduce internal turbulence and pressure drop, improve the thermal temperature distribution, and/or increase overall stiffness of the spray bar 200.

The spray bar base 220 may be designed to have removable features that can improve serviceability. At least some of these control features cannot be manufactured through conventional manufacturing techniques. In some embodiments, the spray bar 200 may be assembled thru conventional manufacturing with other features not easily manufactured in the continuous process. Due to the continuous AM manufacturing method, openings are required to allow excess material to be removed and then may be closed using AM or conventional manufacturing methods. In some embodiments, the spray bar 200 may be manufactured through a continuous AM manufacturing process, which can permit the formation of a combination of geometries that previously required a multitude of individual components and joints into one complete component. In some embodiments, such techniques may reduce the complexity of the part as well as an overall weight savings.

In general, the design of the spray bar 200 is inherently scalable, and can be adjusted to accommodate a multitude of fluid circuits, fluid delivery points, and spray nozzle geometries. In some embodiments, the spray bar 200 can be tuned to any specific application in terms of fluid entry and spray bar installation geometry. Certain design geometries can reduce the stress and/or dissipate thermal energy, optimizing assembly geometry through the use of organic shapes and the elimination of joints.

In some embodiments, the spray bar 200 orifice designs can be created using continuous AM manufacturing processes, and can varied in type and orientation, to produce a spray bar thru multiple passages. For example, a spray bar having a predetermined spray configuration that can be designed for a particular turbine engine or a unique location within a turbine engine. Greater fuel spray distribution and improved combustion can improve light off and reduce deleterious combustion effects. Greater fuel spray distribution can also provide selective fuel flow in terms of flow direction (e.g., unidirectional, bidirectional, or biased directional flow). In some embodiments, the spray bar 200 can be designed to provide predetermined fuel delivery on high pressure and low pressure sides of augmenter vanes, or provide predetermined thermal conduction. For example, some types of spray bar designs incorporate alternating helical, spiral, or similar geometric internal support, simple support features with repetitive cutout flow features, and/or uni-body construction, allowing for planned management of thermal expansion within the component. The spray bar 200 can also incorporate a tube-in-tube arrangement, intertwined tubes, or a side-by-side tube passage design that can be inherently stiffer through use of the continuous AM process, reducing stress concentrations at the joints and increasing the overall spray bar stiffness. Mounting of the spray bar can be directly incorporated into the single piece component as well as other features such as spring retention, retaining wire features, and integral wear retention features. This can increase part structural strength and rigidity, while increasing design flexibility.

In some embodiments, profiles of single-piece composite spray bars may be optimized for fluid performance within the engine, which can reduce drag and/or increase engine performance. The profile may also be shaped to aid in engine air stream, fluid control, and/or combustion stability. In some embodiments, the spray bar 200 may also incorporate integral heat shielding and cooling features into the uni-body construction, as well as integral attachment points.

The spray bar 200 includes internal supports that aid in manufacture while also providing conformal flow or flow directing features. Furthermore, these conformal flow features can direct flow to exits in the multiple passages disturbing the flow and increasing the flow at an exit distributed thru out the spray bar. The inlets to the spray bar 200 can also be continuously manufactured but may be designed to accommodate braze, weld, threads, or other common fuel passage attachment features. In some embodiments, the flow exits can be manufactured to accept multiple attachments of fixed or removable augmenting features for flow distribution. In some embodiments, the external support or attachment of the spray bar 200 may be incorporated in the design by adding supporting legs or thru holes for integrated attachment methods.

Many of the problems associated with previous spray bars is solved by the spray bar 200 by combining multiple pieces into predetermined cross sections with conformal flow and with customizable orifice geometries. Several types of orifices may be manufactured to accommodate a wide range of fluid flow and spray patterns. A reduced number of parts and joints by manufacturing simultaneously can improve stiffness of the assembly, improve flow, reduce pressure drop and reduce tolerance stack ups associated with multiple piece assemblies.

In some embodiments, additional benefits may be realized through increased pressure in critical areas and directed flow for coking reduction. In some embodiments, certain geometries may save weight over conventional assemblies by this continuous manufacturing process, for example, by combining parts, reducing joints or optimizing cross section not possible with other manufacturing processes.

Figure 3:
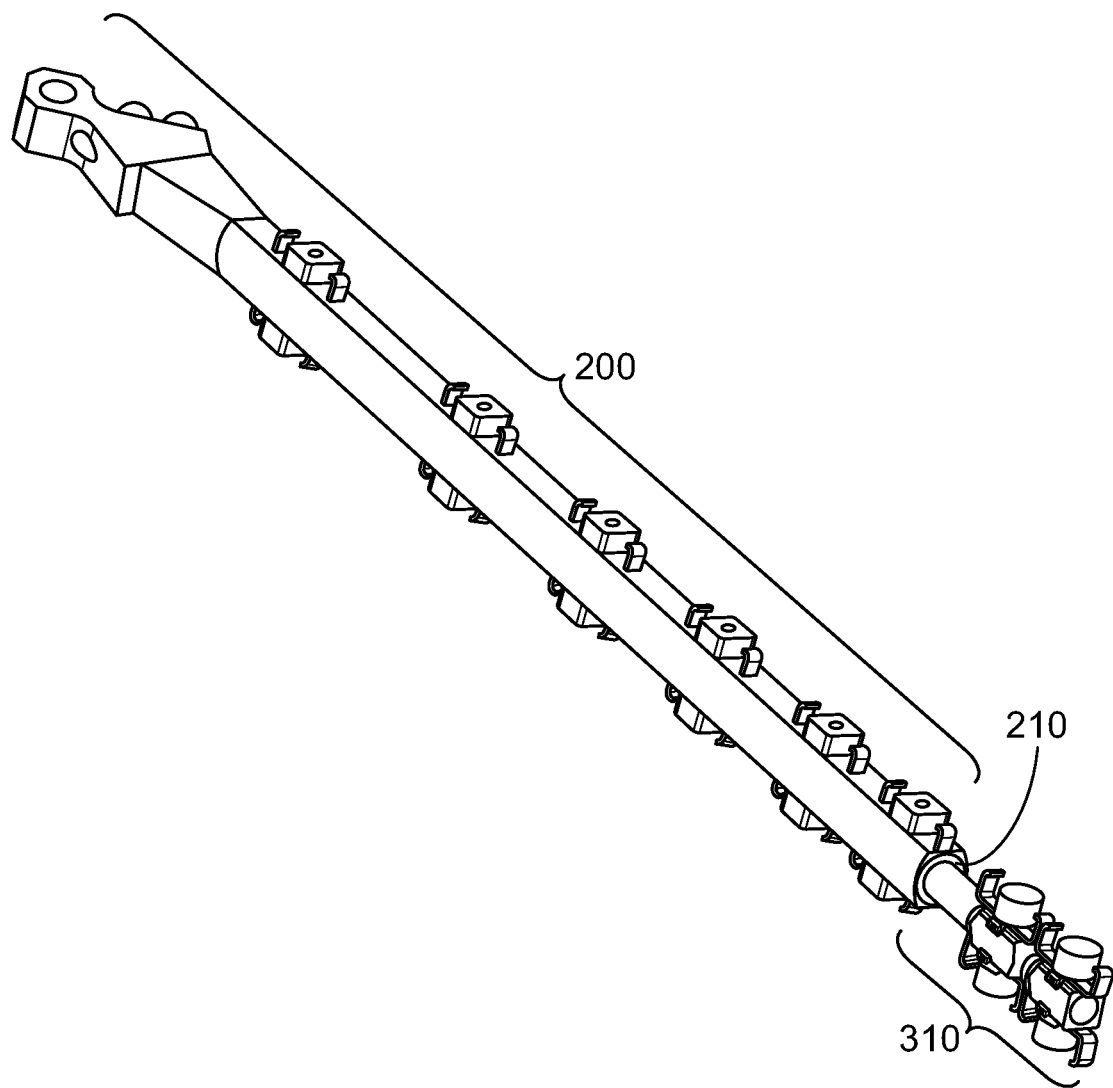
FIG. 3 is a perspective view of an example full composite spray bar with conventional machine tip and details.

FIG. 3 is a perspective view of the example full composite spray bar 200 of FIG. 2 with a conventionally machined tip 310. The end 210 is formed to mate with the tip 310. In some embodiments, the tip 310 may be a conventional component, or a component that requires assembly of subcomponents. For example, the tip 310 may be a separately regulated, mandated, agency-pre-approved component that is more economical to use than to re-create through the system 100 and obtain the appropriate approvals. (e.g., an existing component that has already been approved through a costly qualification process with a customer and/or the Federal Aviation Administration). In another example, the tip 310 may be an assembly of parts, such as electronics, electro-mechanical components (e.g., motors, servos), moving parts (e.g., valve assemblies), AM-incompatible materials (e.g., hardened metals), or combinations of these or other parts that are not formable using the AM techniques as integral parts of the spray bar 200.

Figure 4:
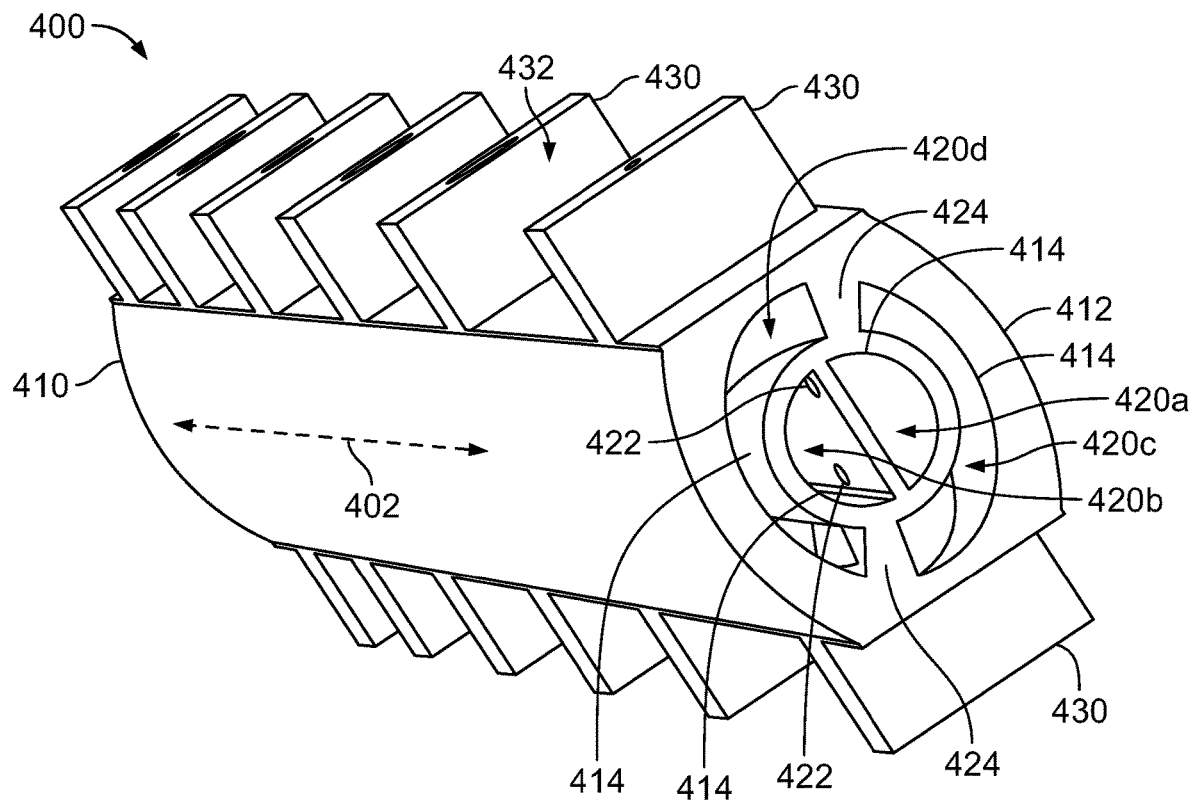
FIG. 4 is a sectional view of an example tube-in-tube design with conformal flow supports.

The spray bar 200 includes several features that would impractical or impossible to form as a one-piece, unitary component formed as a single piece of material without seams or joints. Referring to FIG. 4 is a sectional view of an example tube-in-tube design a spray bar 400 with conformal flow supports is shown. In some embodiments, the design 400 can be used with the spray bar 200.

The spray bar 400 includes a one-piece, unitary housing 410 having a lengthwise (e.g., major) dimension, represented by arrow 402. The geometry of the housing 410 defines a number of internal and external features. The housing 410 includes a collection of outer surfaces 412 and a collection of inner surfaces 414.

The inner surfaces 414 form tubular walls that define a collection of lumens 420a-420d. In some embodiments, the sizes, shapes, and locations of the lumens 420a-420d can be predetermined and configured to control the flow of fluid along the lumens 420a-420d. In the illustrated example, the lumens 420a and 420b are arranged substantially parallel to each other along the length 402 of the housing 410. The lumens 420c and 420d are curved, and are arranged as a helix or spiral with each other along the length 402 of the housing 410.

The inner surfaces 414 also define a collection of apertures 422. At least some of the apertures 422 are defined by lengthwise discontinuities along the inner surfaces 414. In some embodiments, the sizes, shapes, and locations of the apertures 422 can be predetermined and configured to control the flow of fluid along and between the lumens 420a-420d.

The inner surfaces 414 form a collection of support structures 424. The support structures 424 are formed integrally with the housing 410 as a single, seamless piece of material. The support structures 424 are configured to support internal geometries of the design 400, such as material of the housing 410 that forms the walls of the lumens 420a-420d. In some embodiments, the support structures 424 can be designed to perform multiple functions, such as defining lumens, positioning lumens relative to each other and/or within the interior of the housing 410, acting as flow modifiers, acting as structural reinforcements, increasing or decreasing the rigidity of various regions, and/or combinations of these and any other appropriate structural functions within a fluid conduit.

The outer surfaces 412 include a collection of fins 430. The fins extend radially away from the housing 410. In the illustrated example, the fins 430 are at least partly discontinuous along the length 402. For example, a lengthwise gap 432 is defined between two of the fins 430. In some embodiments, the sizes, shapes, and locations of the fins 430 can be predetermined and configured to control the flow of fluid (e.g., air) across and around the housing 410.

Figure 5:
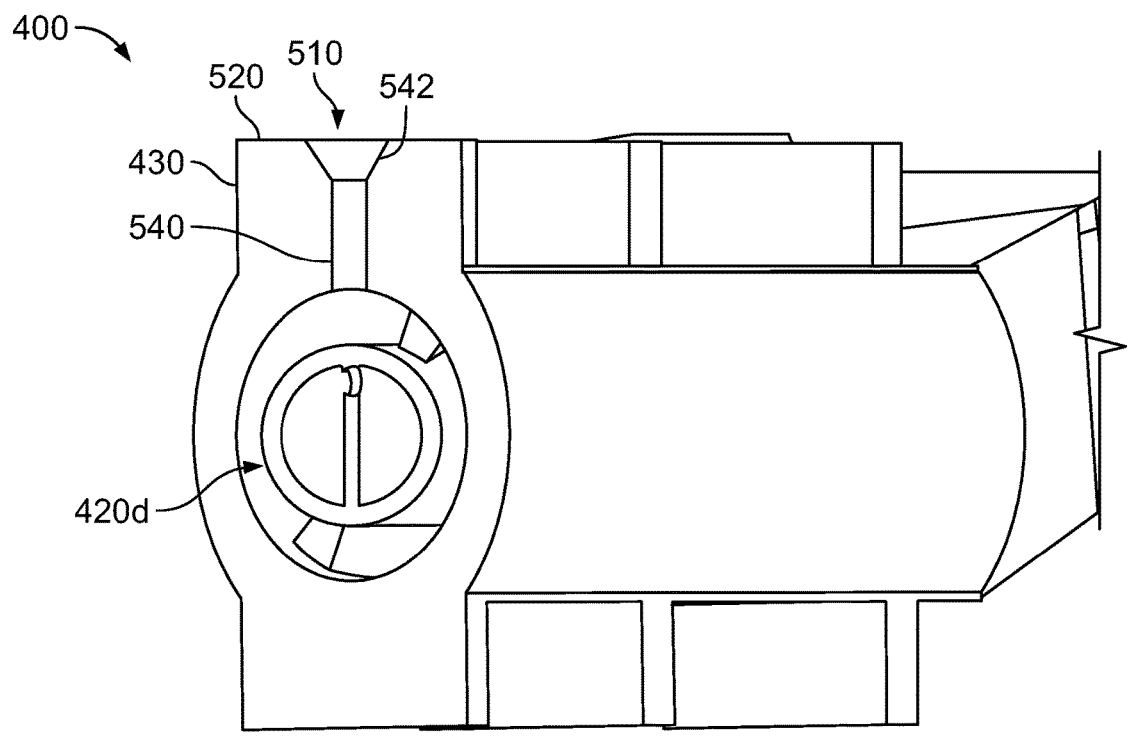
FIG. 5 is a sectional view of an example orifice geometry with conformal flow and supports.

FIG. 5 is a sectional view of an example orifice geometry of the spray bar 400 with conformal flow and supports. In the illustrated example, one of the fins 430 is shown in cross-section. The fin 430 is formed such that it defines a fluid outlet 510 as a seamless outlet lumen within a portion of the fin 430 and fluidly connects the lumen 420d to an outer surface 520 of the fin 430. The fluid outlet 510 is configured as a fluid spray nozzle, and includes a throat 540 and a divergence taper 542. In some embodiments, the fluid outlet 510 can also include a convergence taper (not shown). The fluid outlet 510 is formed with a seamless, predetermined geometry. In some embodiments, the fluid outlet 510 can be formed with a predetermined geometry that can modify the flow through and out of the fluid outlet 510. For example, the fluid outlet 510 can be formed with convergence, throat, and/or divergence geometries to urge a fluid flow into a stream, jet, spray, atomization, or any other appropriate fluid outflow.

Figure 6:
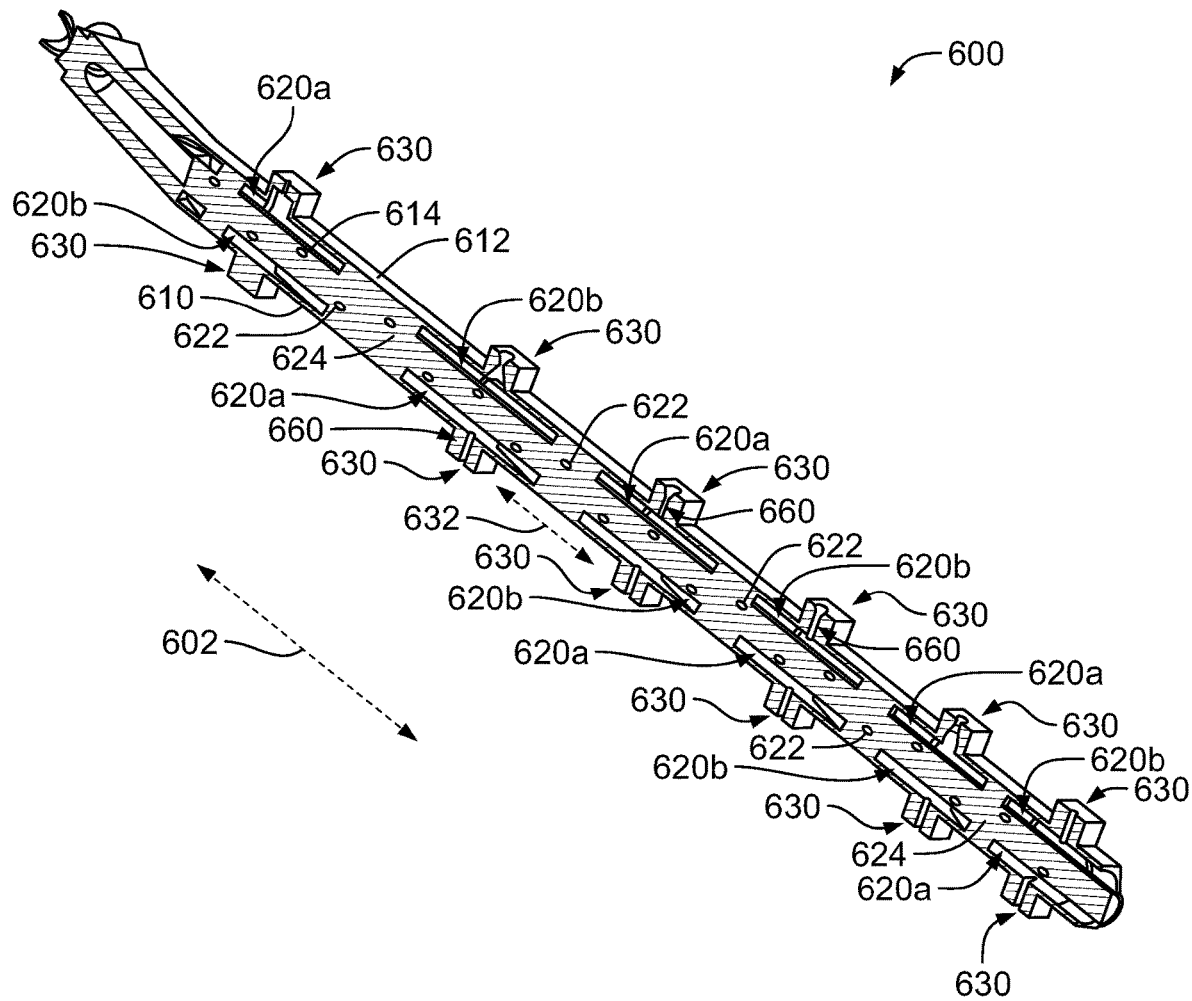
FIG. 6 is a sectional view of an example composite spray bar and orifices with zone conformal support.

FIG. 6 is a sectional view of an example composite spray bar 600 and orifices with zone conformal support. In some embodiments, the spray bar 600 can be the example spray bar 200 of FIG. 2.

The spray bar 600 includes a one-piece, unitary housing 610 having a lengthwise (e.g., major) dimension, represented by arrow 602. The geometry of the housing 610 defines a number of internal and external features. The housing 610 includes a collection of outer surfaces 612 and a collection of inner surfaces 614.

The inner surfaces 614 form tubular walls that define a collection of lumens 620a and 620b. In some embodiments, the sizes, shapes, and locations of the lumens 620a, 620b can be predetermined and configured to control the flow of fluid along the lumens 620a, 620b. In the illustrated example, the lumens 620a and 620b are curved, and are arranged as a helix or spiral with each other along the length 602 of the housing 610.

The inner surfaces 614 also define a collection of apertures 622. At least some of the apertures 622 are defined by lengthwise discontinuities along the inner surfaces 614. In some embodiments, the sizes, shapes, and locations of the apertures 622 can be predetermined and configured to control the flow of fluid along and between the lumens 620a, 620b.

The inner surfaces 614 form a collection of support structures 624. The support structures 624 are formed integrally with the housing 610 as a single, seamless piece of material. The support structures 624 are configured to support internal geometries of the design 600, such as material of the housing 610 that forms the walls of the lumens 620a, 620b. In some embodiments, the support structures 624 can be designed to perform multiple functions, such as defining lumens, positioning lumens relative to each other and/or within the interior of the housing 610, acting as flow modifiers, acting as structural reinforcements, increasing or decreasing the rigidity of various regions, and/or combinations of these and any other appropriate structural functions within a fluid conduit.

The outer surfaces 612 include a collection of fluid outlets 630. The fins extend radially away from the housing 610. In the illustrated example, the fluid outlets 630 are at least partly discontinuous along the length 602. For example, a lengthwise gap 632 is defined between two of the fluid outlets 630. In some embodiments, the sizes, shapes, and locations of the fluid outlets 630 can be predetermined and configured to control the flow of fluid (e.g., air) across and around the housing 610. The fluid outlets 630 are formed such that each defines a fluid outlet lumen 660 as a seamless outlet lumen within portions of the fluid outlets 630, and fluidly connect the lumens 620a, 620b to an outer surface of the fluid outlets 630.

Figure 7:
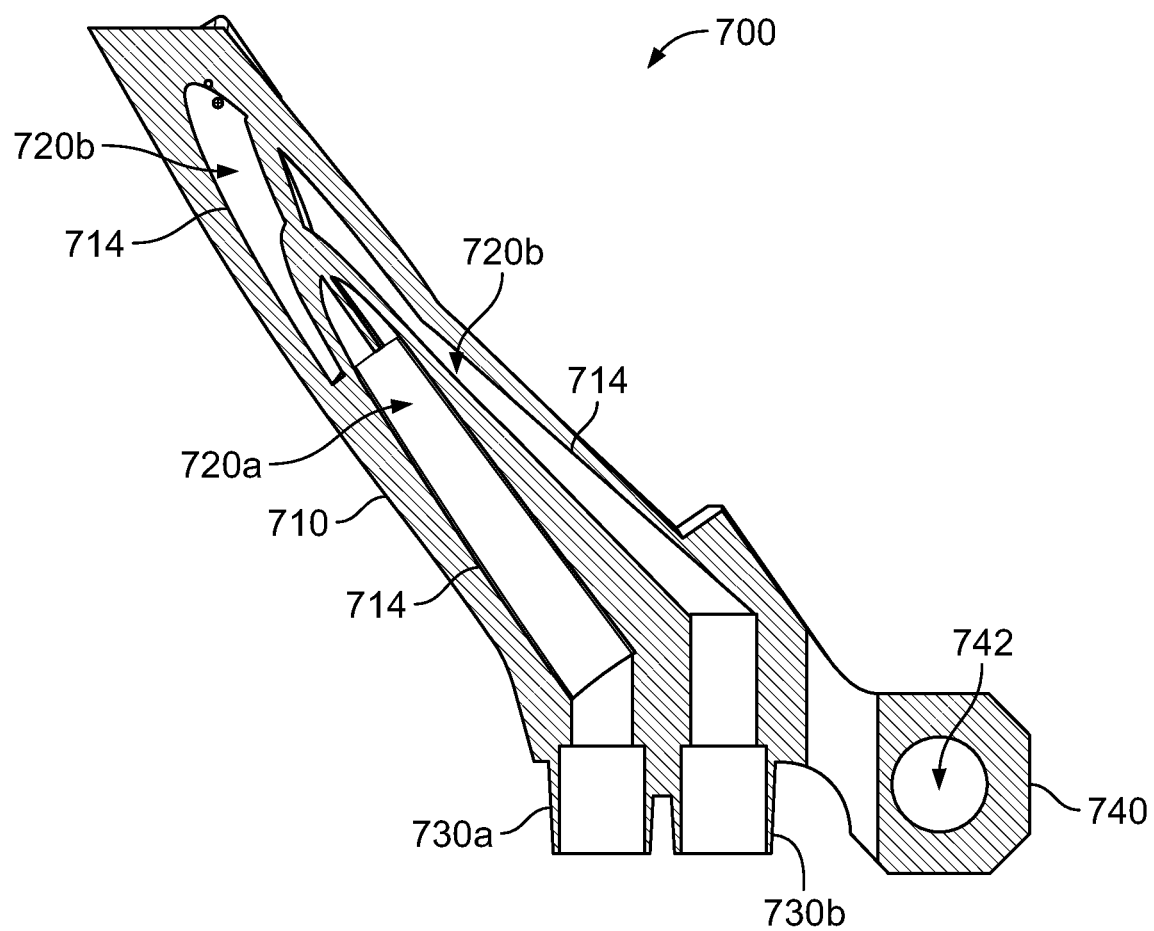
FIG. 7 is a sectional view of an example spray bar base with split flow.

FIG. 7 is a sectional view of an example spray bar base 700 with split flow. In some embodiments, the base 700 can be the spray bar base 220 of the example spray bar 200 of FIG. 2. The base 700 is a one-piece, unitary component formed as a single piece of material without seams or joints.

The base 700 includes a housing 710. A collection of interior surfaces 714 defines a lumen 720a and a lumen 720b. The lumens 720a and 720b are formed with lengthwise curves that partly spiral around each other along the major axis of the housing 710.

The interior surfaces 714 also define a fluid inlet 730a and a fluid inlet 730b. The fluid inlet 730a is in fluid communication with the lumen 720a, and the fluid inlet 730b is in fluid communication with the lumen 720b. In some embodiments, the fluid inlets 730a, 730b can be formed with additional connective features, such as threads, that can create a fluid coupling between the base 700 and a fluid (e.g., fuel) supply.

An outer surface 712 of the housing defines a mount 740. The mount 740 is configured to couple the base 700 to an external structure, such as an airframe. The mount 740 is formed with a lengthwise discontinuity 742 (e.g., a transverse aperture) formed as a bolt hole.

FIG. 8 is a sectional view of an example spray orifice 800 with conformal and directed flow supports. In some embodiments, the spray orifice 800 can be used with the example spray bar 200 of FIG. 2 or the example spray bar 600 of FIG. 6.

In the illustrated example, a fluid outlet 801 is shown in cross-section. The fluid outlet 801 is formed such that it defines the spray orifice 800 as a seamless outlet lumen within a portion of the fluid outlet 801, and fluidly connects a lumen 810 to an outer surface 820 of the fluid outlet 801. The spray orifice 800 is configured as a fluid spray nozzle, and includes a throat 840, a divergence taper 842, and a convergence taper 844.

The fluid outlet 801 is formed with a seamless, predetermined geometry. In some embodiments, the fluid outlet 801 can be formed with a predetermined geometry that can modify a fluid flow through and out of the fluid outlet 801. For example, the fluid outlet 801 can be formed with convergence, throat, and/or divergence geometries to urge a fluid flow into a stream, jet, spray, atomization, or any other appropriate fluid outflow.

FIG. 9 is a sectional view of an example spray orifice 900 with conformal flow and directed flow. In some embodiments, the spray orifice 900 can be used with the example spray bar 200 of FIG. 2 or the example spray bar 600 of FIG. 6.

In the illustrated example, a fluid outlet 901 is shown in cross-section. The fluid outlet 901 is formed such that it defines the spray orifice 900 as a seamless outlet lumen within a portion of the fluid outlet 901, and fluidly connects a lumen 910 to an outer surface 920 of the fluid outlet 901. The spray orifice 900 is configured as a fluid spray nozzle, and includes a throat 940 and a convergence taper 944.

The fluid outlet 901 is formed with a seamless, predetermined geometry. In some embodiments, the fluid outlet 901 can be formed with a predetermined geometry that can modify a fluid flow through and out of the fluid outlet 901. For example, the fluid outlet 901 can be formed with convergence, throat, and/or divergence geometries to urge a fluid flow into a stream, jet, spray, atomization, or any other appropriate fluid outflow.

FIG. 10 is a sectional view of an example spray orifice 1000 with helical orifice directed flow. In some embodiments, the spray orifice 1000 can be used with the example spray bar 200 of FIG. 2 or the example spray bar 600 of FIG. 6.

In the illustrated example, a fluid outlet 1001 is shown. The fluid outlet 1001 is formed such that it defines the spray orifice 1000 as a seamless outlet lumen within a portion of the fluid outlet 1001, and fluidly connects a lumen 1010 to an outer surface 1020 of the fluid outlet 1001. The spray orifice 1000 is configured as a fluid spray nozzle.

The fluid outlet 1001 is formed with a seamless, predetermined geometry. In some embodiments, the fluid outlet 1001 can be formed with a predetermined geometry that can modify a fluid flow through and out of the fluid outlet 1001. For example, the fluid outlet 1001 can be formed with convergence, throat, and/or divergence geometries to urge a fluid flow into a stream, jet, spray, atomization, or any other appropriate fluid outflow.

Figure 11:
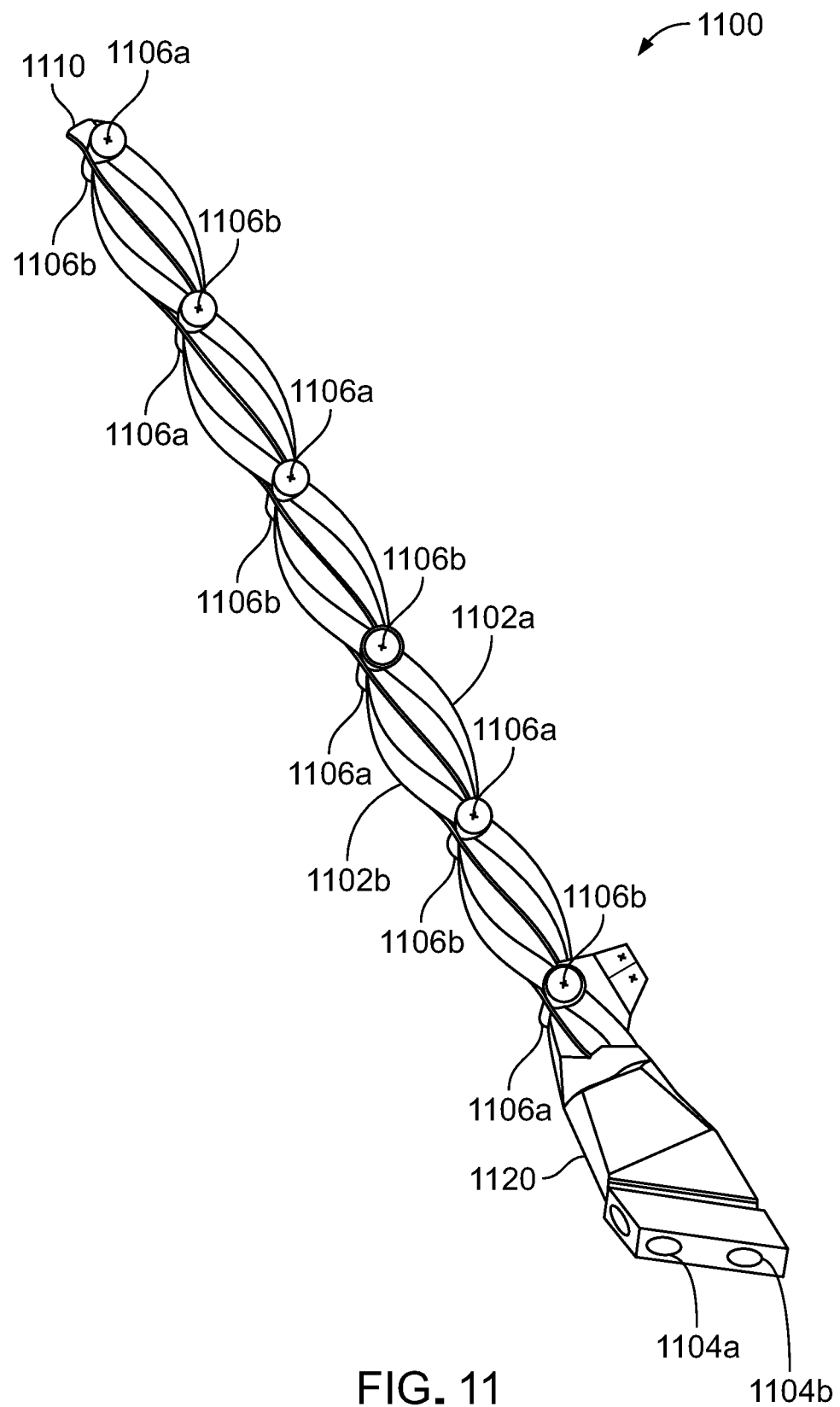
FIG. 11 is a perspective view of an example three-zone composite spray bar with asymmetric fuel dispensing and intertwined tubes.

FIG. 11 is a perspective view of an example three-zone composite spray bar 1100 with asymmetric fuel dispensing and intertwined tubes. In some embodiments, the spray bar 1100 can be the example fluid delivery component 160 of FIG. 1. The spray bar 1100 is a one-piece, unitary component formed as a single piece of material without seams or joints. The spray bar 1100 includes an end 1110 and a spray bar base 1120, both formed integrally with the unitary material of the spray bar 1100.

The spray bar 1100 forms a tube 1102a and a tube 1102b. The tube 1102a is a seamless structure that defines a lumen (not shown) that fluidically connects a fluid inlet 1104a to a collection of fluid outlets 1106a. The tubes 1102a and 1102b are arranged as a spiral or helix relative to each other along the length of the spray bar 1100.

Figure 12:
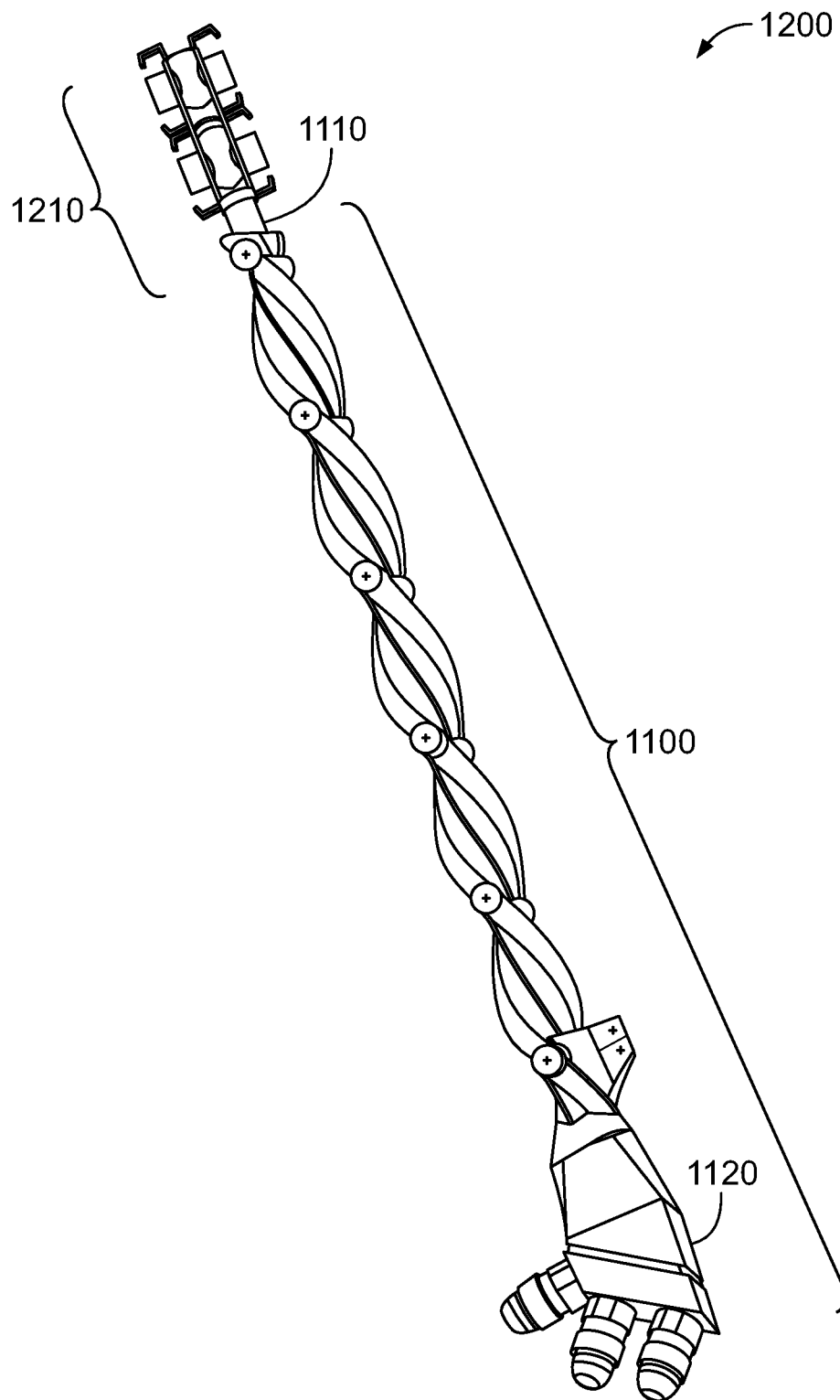
FIG. 12 is a perspective view of an example full composite three-zone spray bar assembly with conventional tip and removable fittings.

FIG. 12 is a perspective view of an example full composite three-zone spray bar assembly 1200 with conventional tip and removable fittings. In some embodiments, the spray bar 1200 can be the example fluid delivery component 160 of FIG. 1. The spray bar 1200 is a one-piece, unitary component formed as a single piece of material without seams or joints.

The assembly 1200 includes the spray bar 1100. A tip 1210 is formed to mate with the end 1110. In some embodiments, the tip 1210 may be the example tip 310 of FIG. 3.

Figure 13:
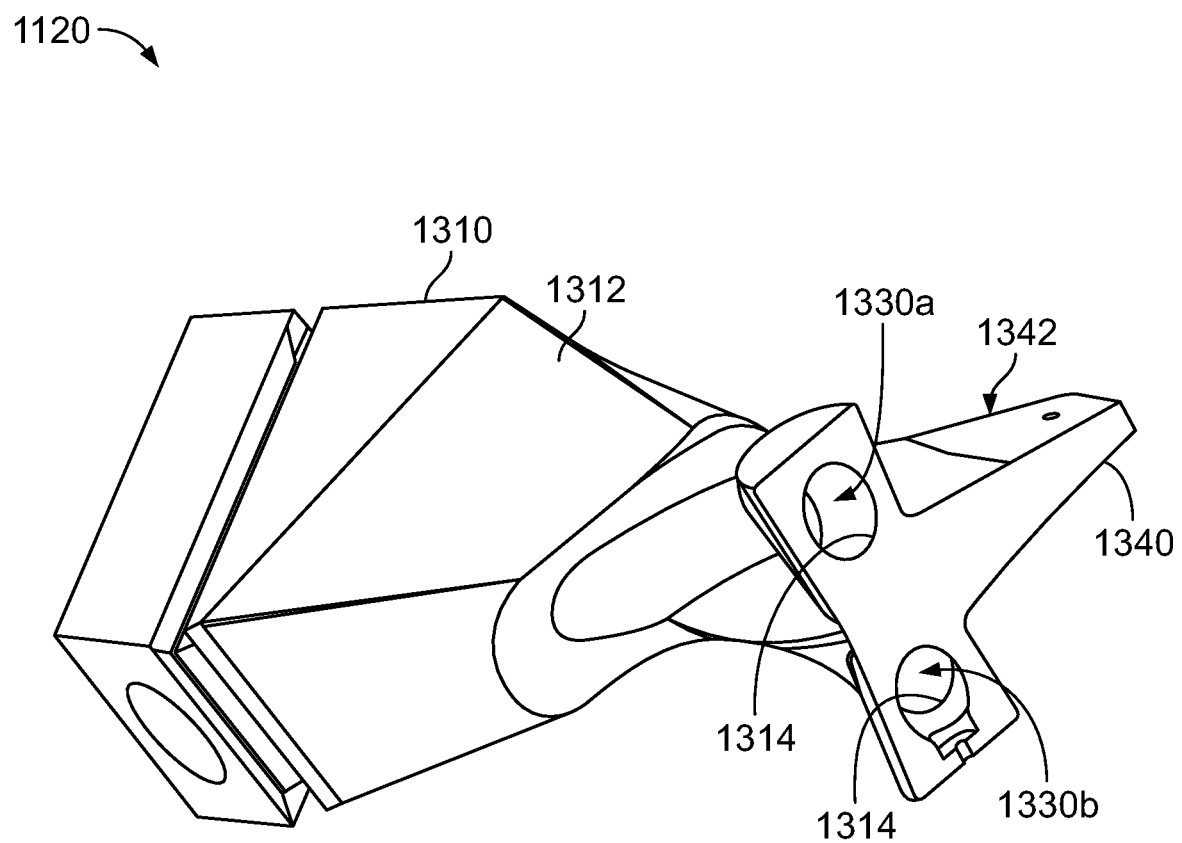
FIG. 13 is a sectional view of an example three-zone composite spray bar with asymmetric orifices.

FIG. 13 is a perspective view of the base 1120. In some embodiments, the base 1120 can be the spray bar base 220 of the example spray bar 200 of FIG. 2. The base 1120 is a one-piece, unitary component formed as a single piece of material without seams or joints.

The base 1120 includes a housing 1310. A collection of interior surfaces 1314 defines a lumen 1320a and a lumen 1320b. The lumen 1320a is in fluid communication with the lumen 1106a, and the lumen 1320b is in fluid communication with the lumen 1106b.

An outer surface 1312 of the housing 1310 defines a mount 1340. The mount 1340 is configured to couple the base 1120 to an external structure, such as an airframe. The mount 1340 is formed with a lengthwise discontinuity 1342 (e.g., a transverse aperture) formed as a bolt hole.

Figure 14:
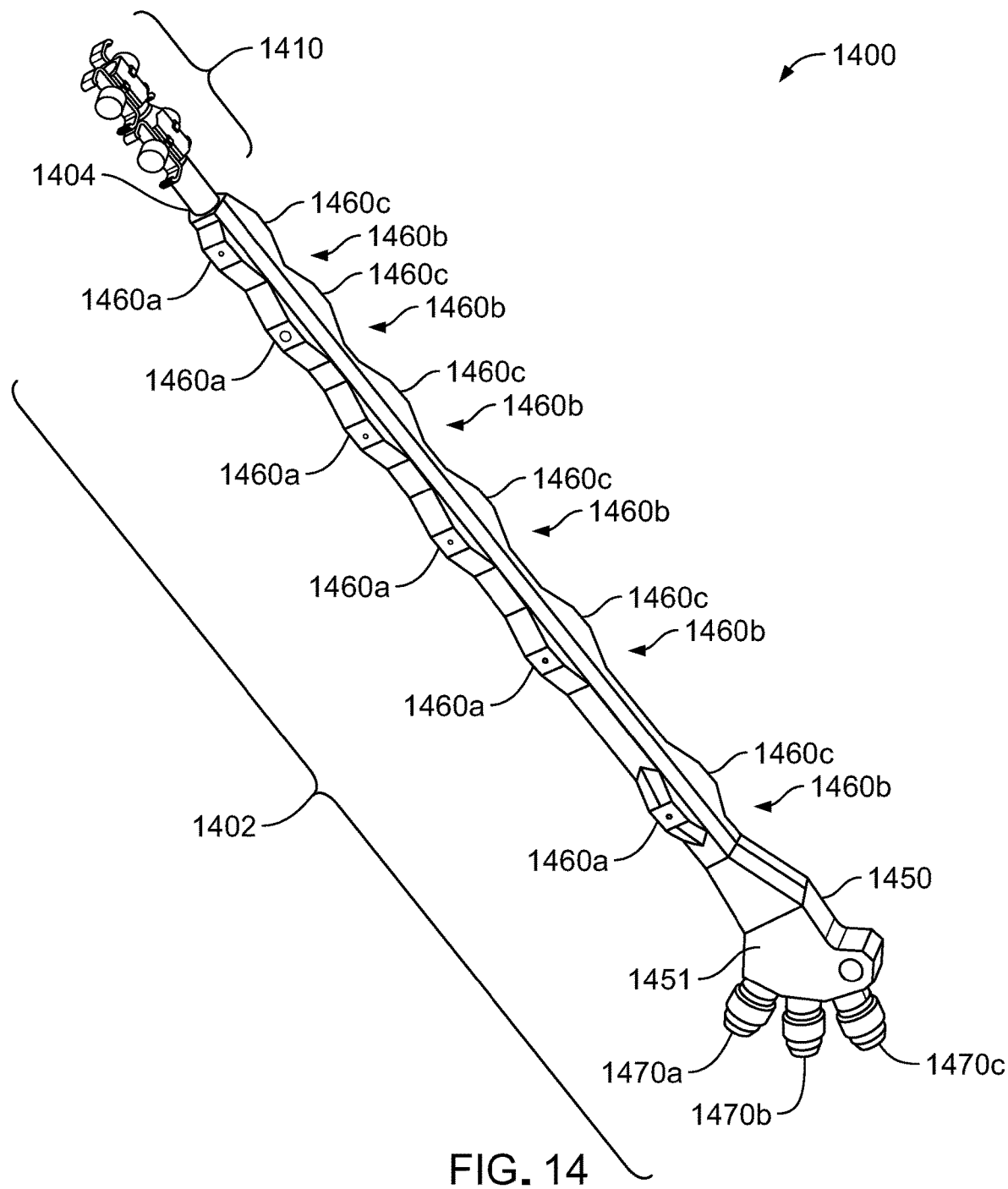
FIG. 14 is a perspective view of an example three-zone spray bar with conventional tip and asymmetric orifices.

FIG. 14 is a perspective view of an example three-zone spray bar assembly 1400 with a tip and asymmetric orifices. In some embodiments, the spray bar assembly 1400 can be the example fluid delivery component 160 of FIG. 1. The assembly 1400 includes a spray bar 1402. The spray bar 1402 is a one-piece, unitary component formed as a single piece of material without seams or joints. The spray bar 1402 includes an end 1404 and a spray bar base 1450, both formed integrally with the unitary material of the spray bar 1402.

A tip 1410 is formed to mate with and end 1404. In some embodiments, the tip 1410 may be the example tip 310 of FIG. 3. The base 1450 includes a housing 1451 and a collection of fluid connectors 1470a-1470c.

Defined within the spray bar 1402 are three lumens (not visible in this view). Each of the lumens is configured to carry fluid to a respective collection of fluid outlets. A collection of fluid outlets 1460a, and a collection of fluid outlets 1460c are visible in FIG. 14. A collection of fluid outlets 1460b is not visible in view shown in FIG. 14.

Figure 15:
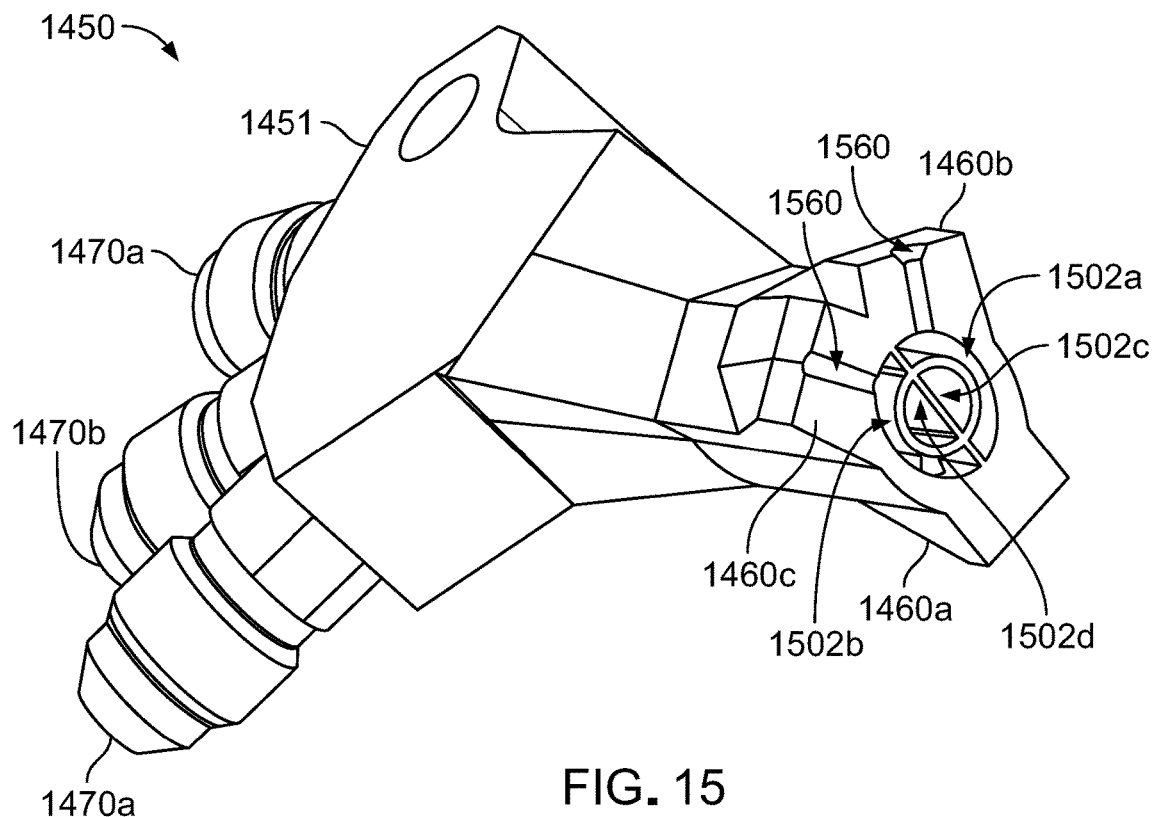
FIG. 15 is a sectional view of an example three-zone spray bar with cross section with asymmetric fuel dispensing.
Figure 16:
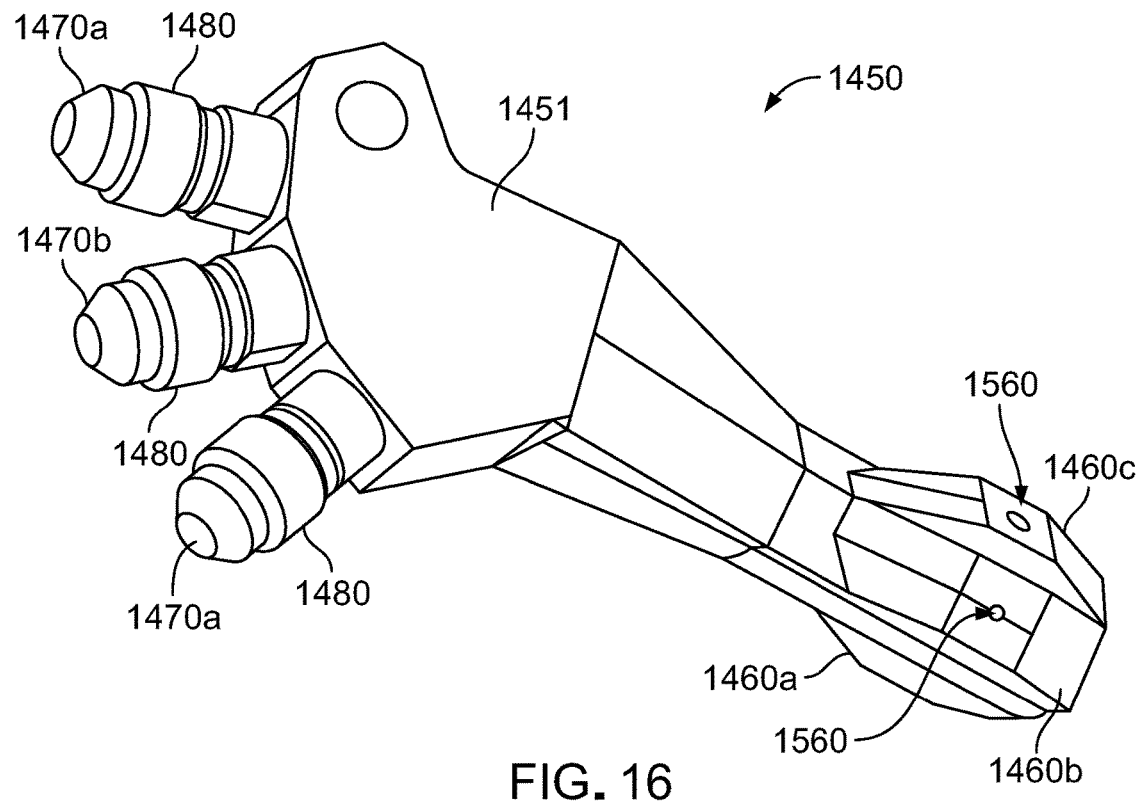
FIG. 16 is a perspective view of an example three-zone spray bar assembly base with removable fittings.
Figure 17:
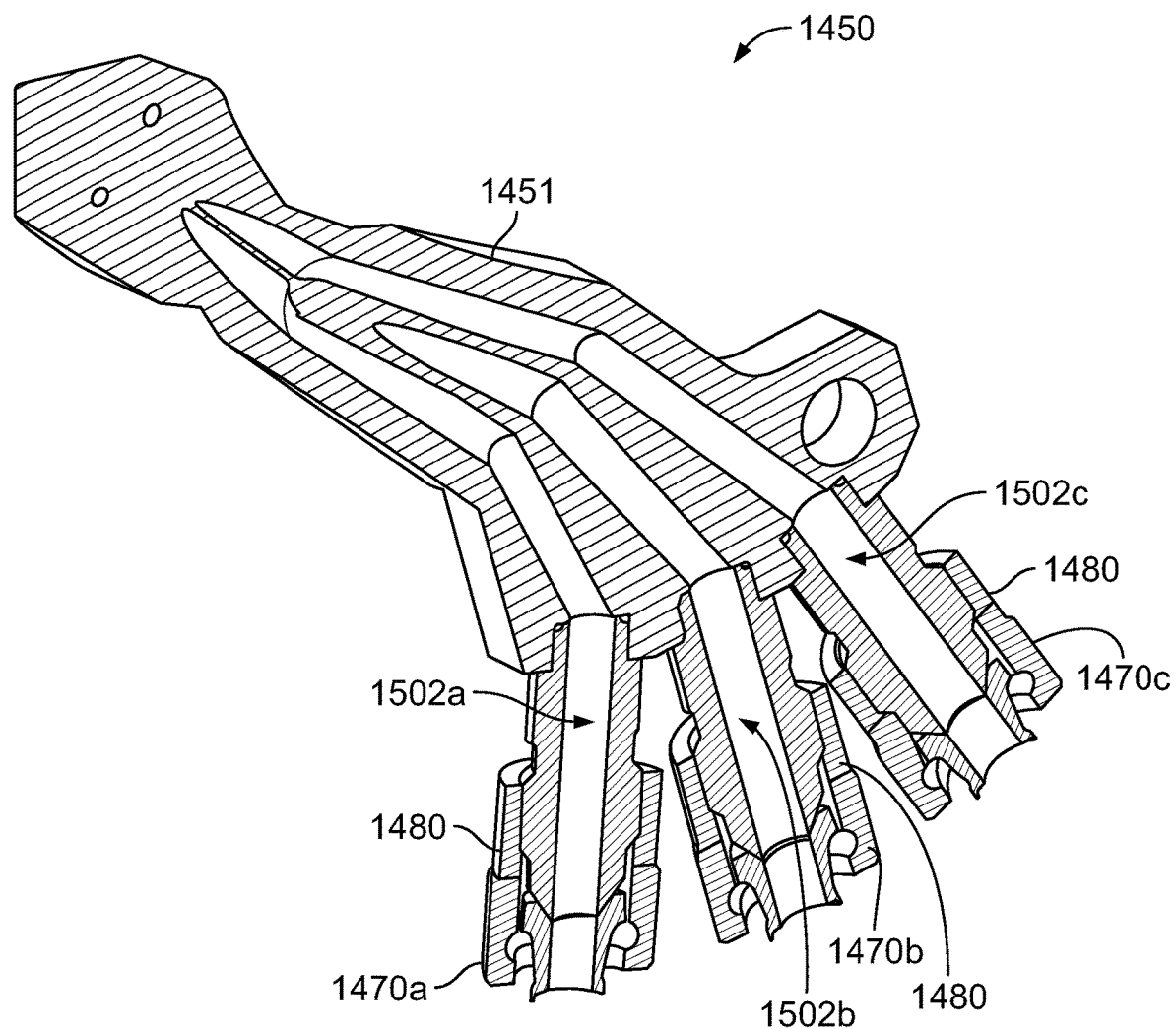
FIG. 17 is a cross-sectional view of an example three-zone spray bar assembly base with removable fittings.

FIG. 15 is a sectional view of the example base 1450 with cross section with asymmetric fuel dispensing. FIG. 16 is a perspective view of the example base 1450 with removable fittings. FIG. 17 is a cross-sectional view of the example base 1450 with removable fittings.

The spray bar 1402 defines a fluid lumen 1502a, a fluid lumen 1502b, a fluid lumen 1502c, and a fluid lumen 1502d. The lumens 1502a-1502d are defined as seamless structures that fluidically connect the fluid inlets 1470a-1470c to the fluid outlets 1460a-1460c. The fluid outlets 1460a-1460c define a collection of outlet lumens 1560 (e.g., fluid nozzles). The fluid connectors 1470a-1470c include fluid fittings 1480 configured to couple the fluid inlets 1470a-1470c to external fluid conduits (not shown) such as a fuel supply.

Figure 18:
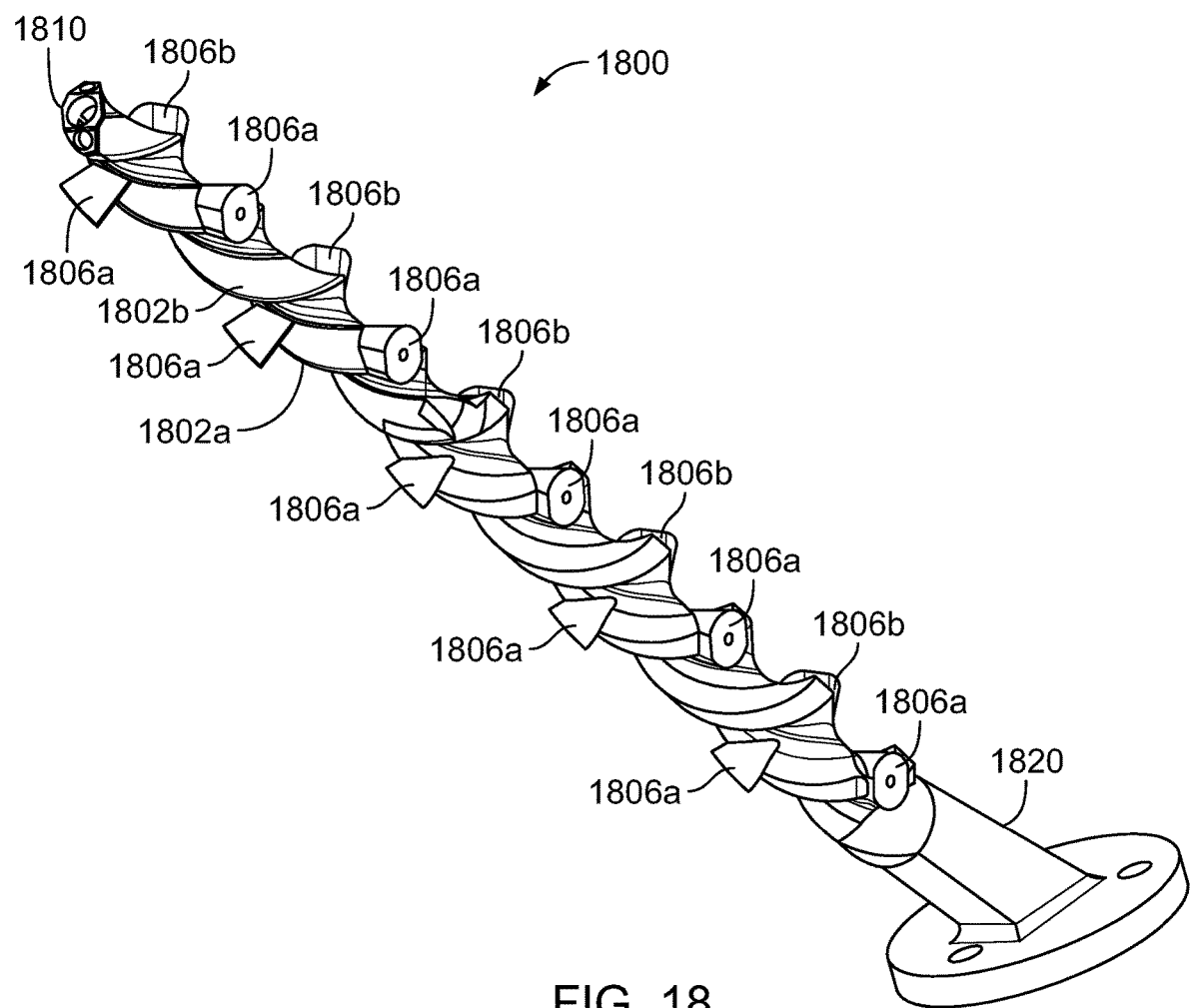
FIG. 18 is a perspective view of an example three-zone composite spray bar with asymmetric fuel dispensing and intertwined tube.

FIG. 18 is a perspective view of an example three-zone composite spray bar 1800 with asymmetric fuel dispensing and intertwined tube. In some embodiments, the spray bar 1800 can be the example fluid delivery component 160 of FIG. 1. The spray bar 1800 is a one-piece, unitary component formed as a single piece of material without seams or joints. The spray bar 1800 includes an end 1810 and a spray bar base 1820, both formed integrally with the unitary material of the spray bar 1800.

Figure 19:
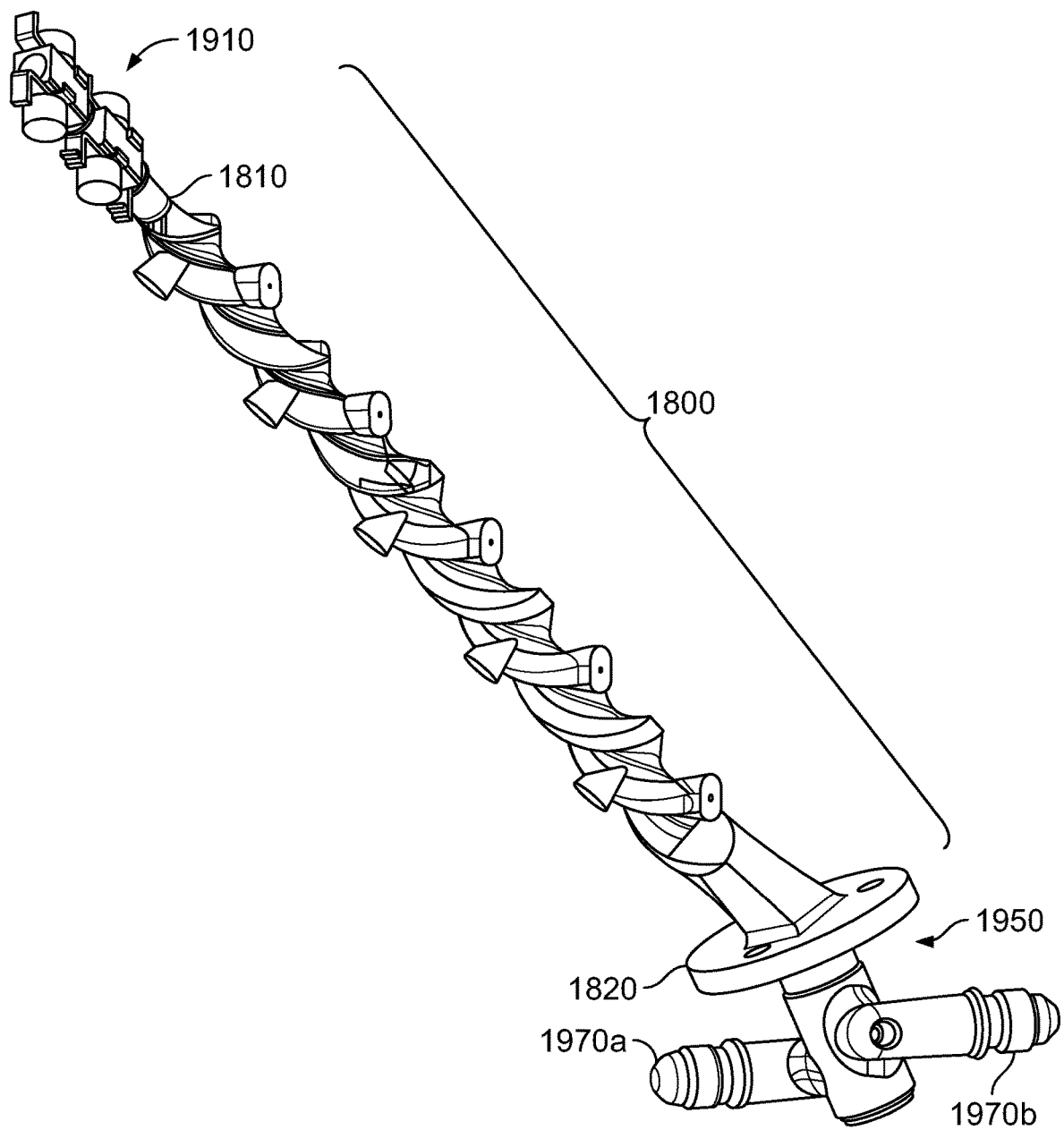
FIG. 19 is a perspective view of an example three-zone spray bar assembly with asymmetric fuel dispensing, conventional tip, and base.

The spray bar 1800 forms a tube 1802a and a tube 1802b. The tube 1802a is a seamless structure that defines a lumen (not shown) that fluidically connects a fluid inlet (not visible in this view) to a collection of fluid outlets 1806a. The tube 1802b is a seamless structure that defines a lumen (not shown) that fluidically connects a fluid inlet (not visible in this view) to a collection of fluid outlets 1806b. The tubes 1802a and 1802b are arranged as a spiral or helix relative to each other along the length of the spray bar FIG. 19 is a perspective view of an example three-zone spray bar assembly 1900. The assembly 1900 includes the example spray bar 1800 of FIG. 18, a base connector 1910, and a tip 1950.

A tip 1910 is formed to mate with and end 1810. In some embodiments, the tip 1910 may be the example tip 310 of FIG. 3. The base connector 1910 is configured to couple a fluid coupler 1970a and a fluid coupler 1970b to the tubes 1802a and 1802b.

Figure 21:
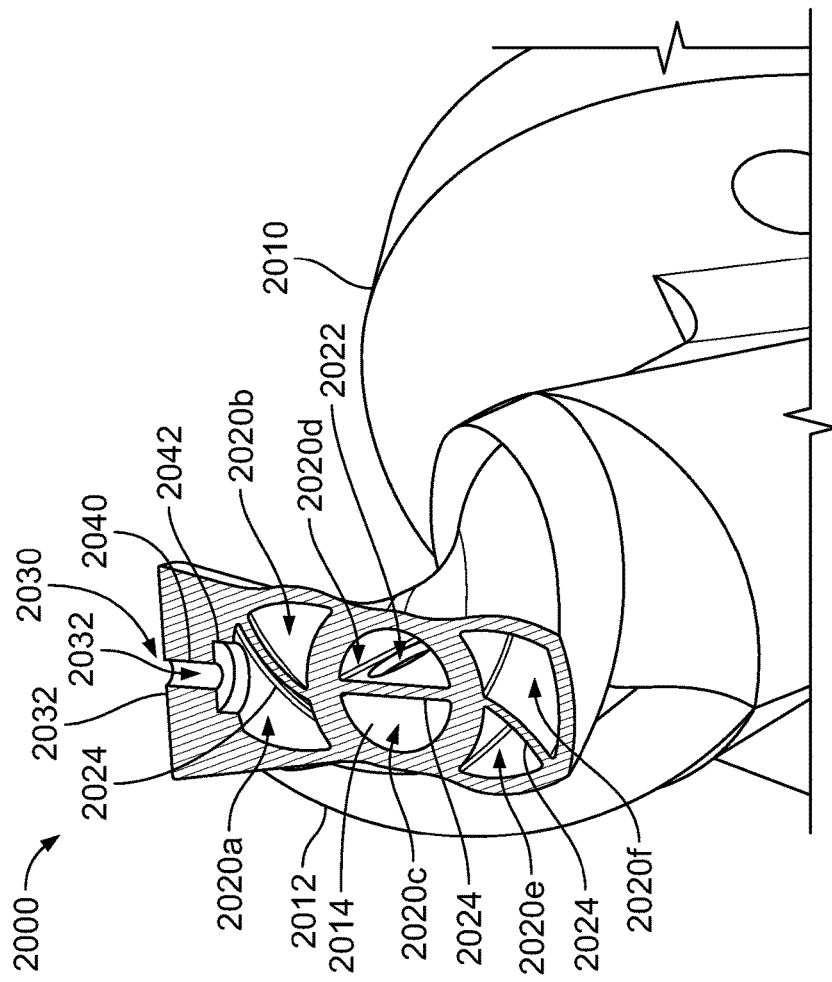
FIG. 21 is an enlarged sectional view of an example three-zone spray bar assembly base with conformal supports and six flow paths.
Figure 20:
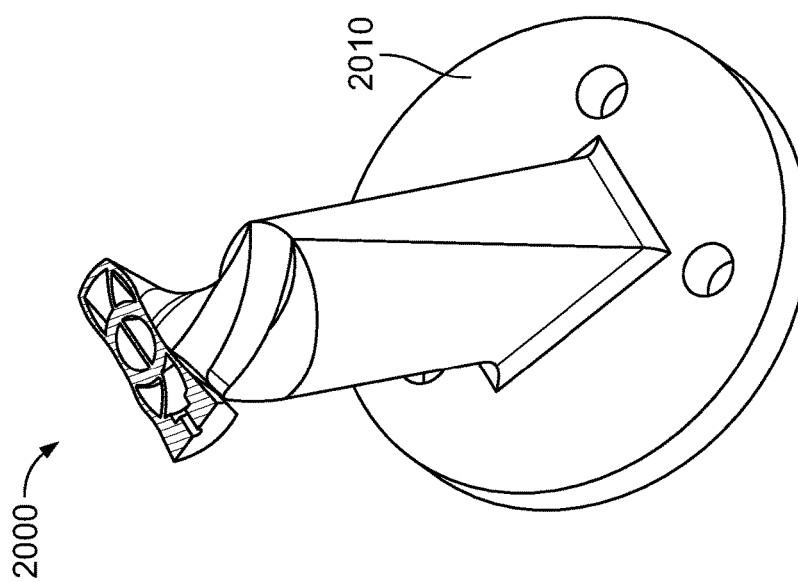
FIG. 20 is a sectional view of an example three-zone spray bar assembly base with conformal supports and six flow paths.

FIG. 20 is a sectional view of an example spray bar base 2000 with conformal supports and six flow paths. FIG. 21 is an enlarged sectional view of the example three-zone spray bar base 2000 with conformal supports and six flow paths. In some embodiments, the spray bar base 2000 can be the example base 1820 of FIGS. 18-19. The base 2000 is a one-piece, unitary component formed as a single piece of material without seams or joints.

The base 2000 includes a housing 2010. The geometry of the housing 2010 defines a number of internal and external features. The housing 2010 includes a collection of outer surfaces 2012 and a collection of inner surfaces 2014.

The inner surfaces 2014 form tubular walls that define a collection of lumens 2020a-2020f. In some embodiments, the sizes, shapes, and locations of the lumens 2020a-2020d can be predetermined and configured to control the flow of fluid along the lumens 2020a-2020d. In the illustrated example, the lumens 2020a, 2020b, 2020e, and 2020f are curved, and are arranged as a helix or spiral with each other.

The inner surfaces 2014 also define a collection of apertures 2022. At least some of the apertures 2022 are defined by lengthwise discontinuities along the inner surfaces 2014. In some embodiments, the sizes, shapes, and locations of the apertures 2022 can be predetermined and configured to control the flow of fluid along and between the lumens 2020c and 2020d.

The inner surfaces 2014 form a collection of support structures 2024. The support structures 2024 are formed integrally with the housing 2010 as a single, seamless piece of material. The support structures 2024 are configured to support internal geometries of the spray bar base 2000, such as material of the housing 2010 that forms the walls of the lumens 2020a-2020f. In some embodiments, the support structures 2024 can be designed to perform multiple functions, such as defining lumens, positioning lumens relative to each other and/or within the interior of the housing 2010, acting as flow modifiers, acting as structural reinforcements, increasing or decreasing the rigidity of various regions, and/or combinations of these and any other appropriate structural functions within a fluid conduit.

The housing 2010 is formed such that it defines a fluid outlet 2030 as a seamless outlet lumen 2032 that fluidly connects the lumen 2020a to an outer surface 2032. The fluid outlet 2030 is configured as a fluid spray nozzle, and includes a throat 2040 and a convergence taper 2042. In some embodiments, the fluid outlet 2030 can also include a divergence taper (not shown). The fluid outlet 2030 is formed with a seamless, predetermined geometry. In some embodiments, the fluid outlet 2030 can be formed with a predetermined geometry that can modify the flow through and out of the fluid outlet 2030. For example, the fluid outlet 2030 can be formed with convergence, throat, and/or divergence geometries to urge a fluid flow into a stream, jet, spray, atomization, or any other appropriate fluid outflow.

Figure 22:
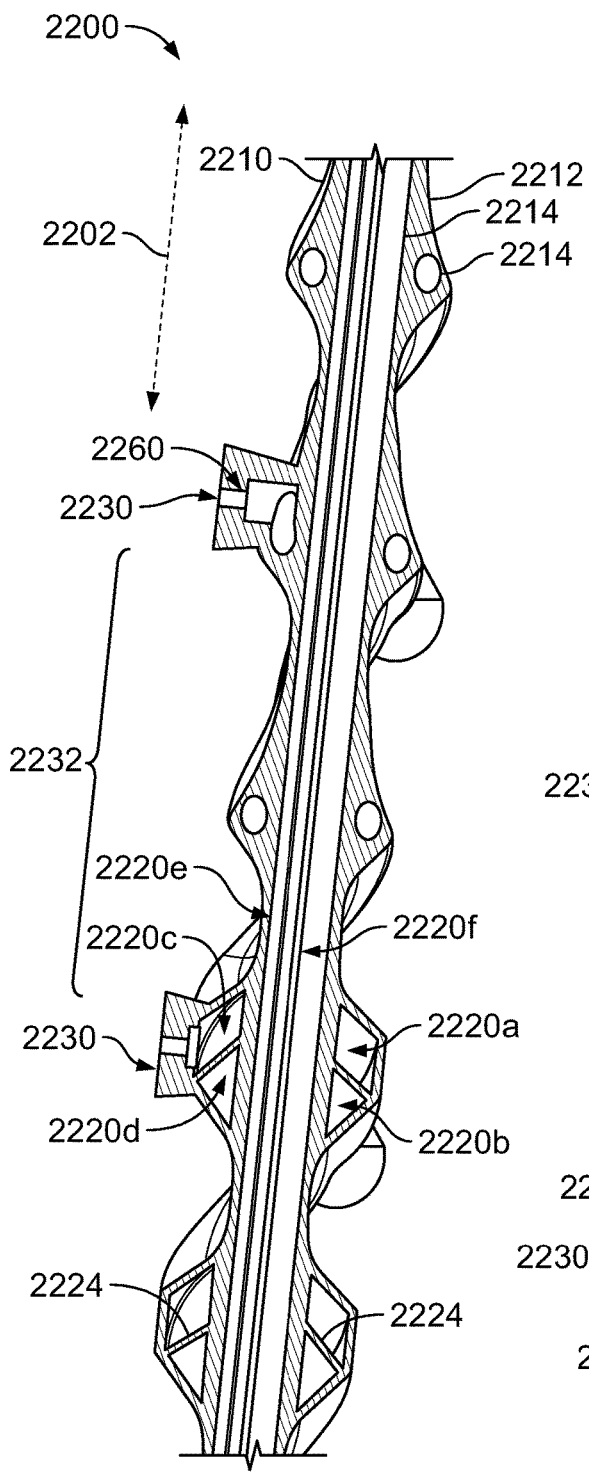
FIG. 22 is a sectional view of an example three-zone spray bar assembly with conformal supports and six flow paths.
Figure 23:
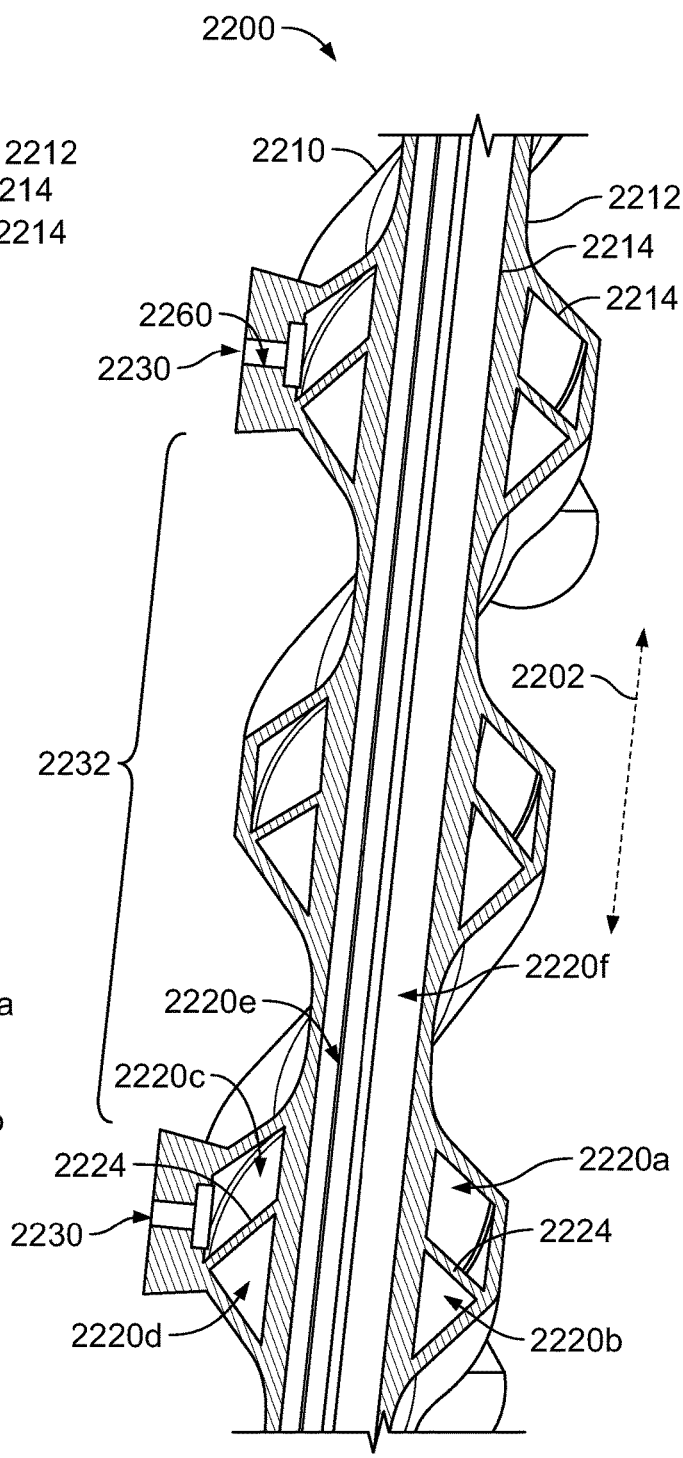
FIG. 23 is a sectional view of an example three zone spray bar assembly with conformal supports and six flow paths.

FIGS. 22 and 23 are sectional views of an example three-zone spray bar 2200 with conformal supports and six flow paths. In some embodiments, the spray bar 2200 can be the example spray bar 1800 of FIG. 18. In some embodiments, the spray bar 2200 can be the example spray bar 200 of FIG. 2.

The spray bar 2200 includes a one-piece, unitary housing 2210 having a lengthwise (e.g., major) dimension, represented by arrow 2202. The geometry of the housing 2210 defines a number of internal and external features. The housing 2210 includes a collection of outer surfaces 2212 and a collection of inner surfaces 2214.

The inner surfaces 2214 form tubular walls that define a collection of lumens 2220a-2220f. In some embodiments, the sizes, shapes, and locations of the lumens 2220a-2220f can be predetermined and configured to control the flow of fluid along the lumens 2220a-2220f. In the illustrated example, the lumens 2220a-2220d are curved, and are arranged as a helix or spiral with each other along the length 2202 of the housing 2210.

The inner surfaces 2214 form a collection of support structures 2224. The support structures 2224 are formed integrally with the housing 2210 as a single, seamless piece of material. The support structures 2224 are configured to support internal geometries of the spray bar 2200, such as material of the housing 2210 that forms the walls of the lumens 2220a-2220f. In some embodiments, the support structures 2224 can be designed to perform multiple functions, such as defining lumens, positioning lumens relative to each other and/or within the interior of the housing 2210, acting as flow modifiers, acting as structural reinforcements, increasing or decreasing the rigidity of various regions, and/or combinations of these and any other appropriate structural functions within a fluid conduit.

The outer surfaces 2212 include a collection of fluid outlets 2230. The outlets 2230 extend radially away from the housing 2210. In the illustrated example, the fluid outlets 2230 are at least partly discontinuous along the length 2202. For example, a lengthwise gap 2232 is defined between two of the fluid outlets 2230. In some embodiments, the sizes, shapes, and locations of the fluid outlets 2230 can be predetermined and configured to control the flow of fluid (e.g., air) across and around the housing 2210. The fluid outlets 2230 are formed such that each defines a fluid lumen 2260 as a seamless outlet lumen within portions of the fluid outlets 2230, and fluidly connect the lumens 2220a-2220f to an outer surface of the fluid outlets 2230.

FIG. 24 is a perspective view of an example three-zone fountain spray bar 2400 with angular fuel dispensing and separate tube support without heat shield. FIG. 25 is another perspective view of the spray bar 2400. FIG. 26 is a sectional side view of the spray bar 2400. In some embodiments, the spray bar 2400 can be the example spray bar 200 of FIG. 2. The spray bar 2400 is formed as a one-piece, unitary component formed as a single piece of material without seams or joints.

The spray bar 2400 includes a main body 2401, a lattice tip 2410, and a base 2450. FIG. 27 is an enlarged perspective view of the example lattice tip 2410. The lattice tip 2410 is formed integrally with the unitary material of the spray bar 2400.

The lattice tip defines a collection of outlet lumens 2710. The outlet lumens 2710 fluidly connect a fluid lumen 2712 to the outside of the housing 2401. The outlet lumens 2710 are defined as nozzles having a predetermined shape, with throats, convergence tapers, and/or divergence tapers as appropriate for various types of fluid output patterns (e.g., jets, sprays).

Figure 28:
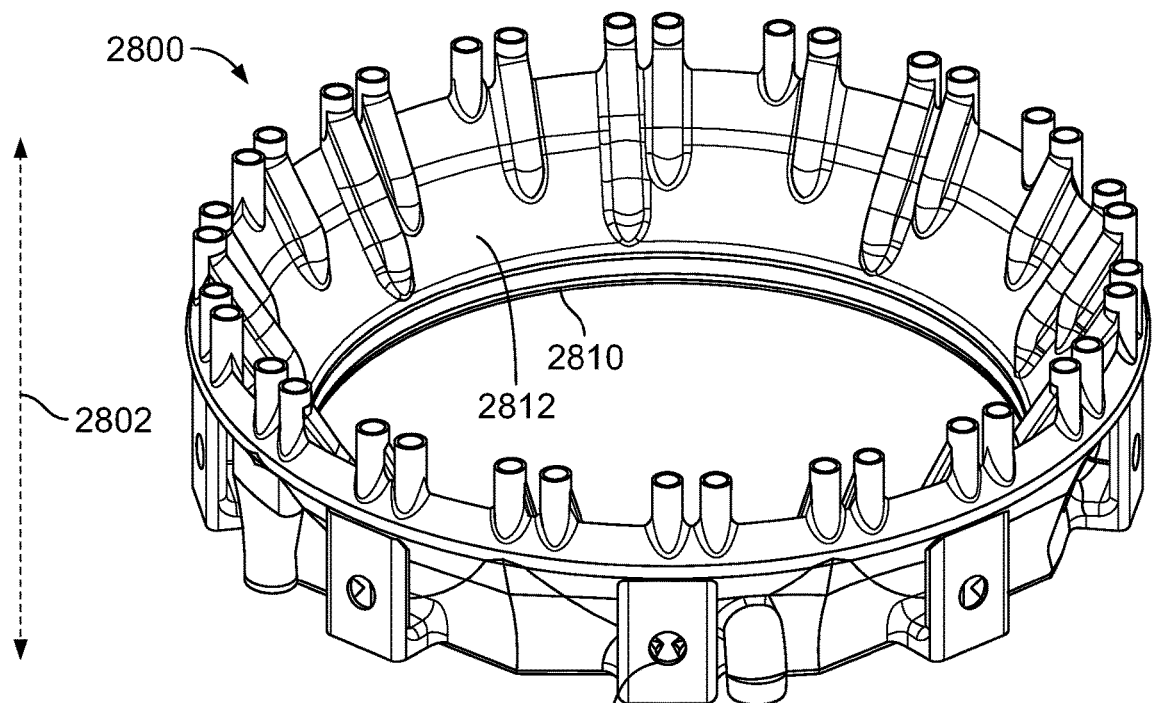
FIG. 28 is a perspective view of an example integrated multi-passage manifold with angled circuit stacking.
Figure 29:
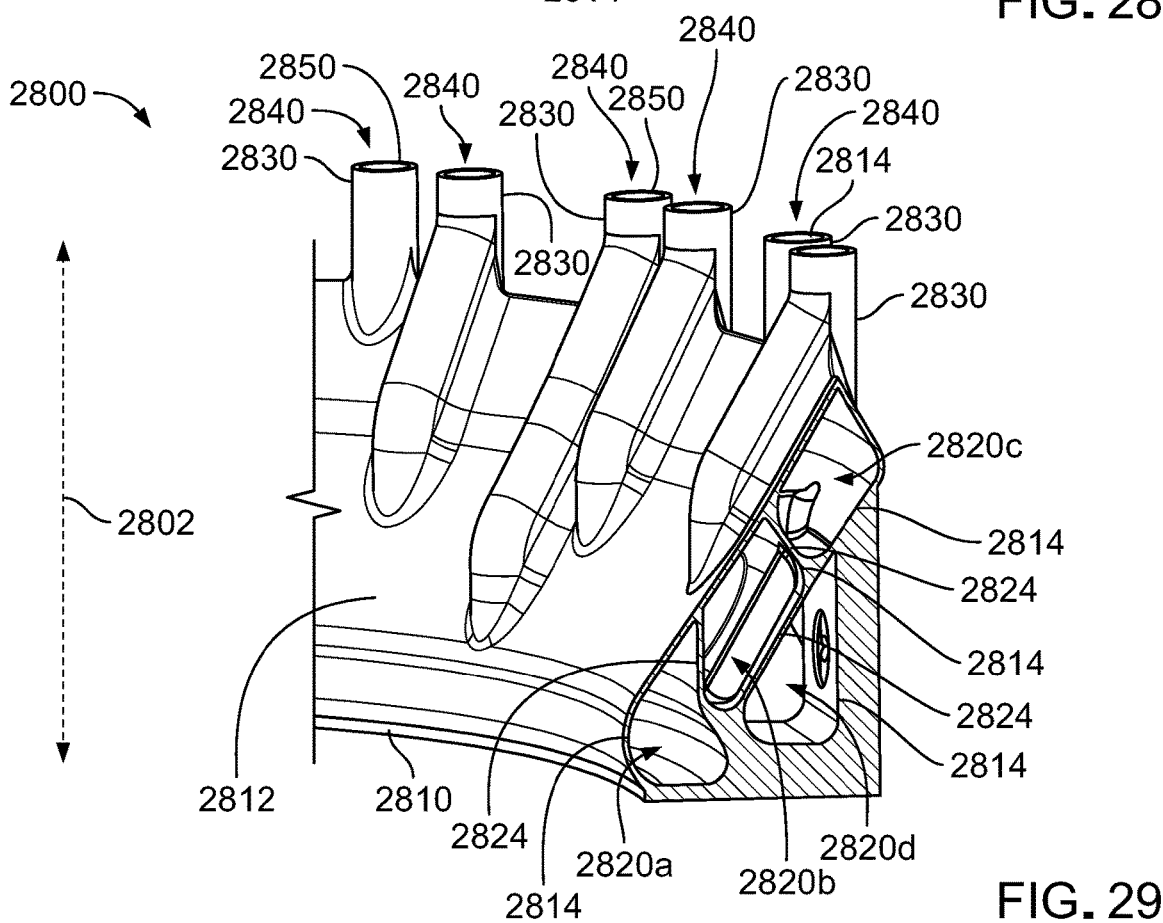
FIG. 29 is a cross-sectional view of an example integrated multi-passage manifold with angled circuit stacking.

FIG. 28 is a perspective view of an example integrated multi-passage manifold 2800. FIG. 29 is a cross-sectional view of the manifold 2800 that shows angled circuit stacking. In some embodiments, the manifold 2800 can be the example fluid delivery component 160 of FIG. 1. The manifold 2800 is a one-piece, unitary component formed as a single piece of material without seams or joints. The manifold 2800, and the manifolds that will be described below, can include many of the features described for the spray bars above, except that the tubes and lumens can be formed as loops.

Generally speaking, the manifold 2800 is a single piece fuel manifold with multiple annular passages that are constructed of self-supporting geometry, including internal structures, which were previously impossible or impractical to produce in a cost effective manner using traditional machining techniques. These passages may be stacked vertically, inclined, or inverted with respect to one another, utilizing self-supporting geometry to allow various build angles. Some embodiments of the manifold 2800 may include internal features that can control and direct the flow of fluid through the annular passages in such a way as to control, reduce, or prevent dead spaces, minimize coking potential by creating selective high velocity areas, reduce internal turbulence and pressure drop, and/or improve augmenter response time, performance, and/or service life. Some of these control features cannot be manufactured through conventional manufacturing techniques. The manifold 2800 may be manufactured through a continuous AM process, which can allows for combinations of geometries that previously required a multitude of individual components and joints to be assembled into one complete component. The use of AM techniques can be used to reduce the complexity of the part, and can result in a weight savings as well.

The design of the manifold 2800 is inherently scalable, and can be adjusted to accommodate a multitude of fluid circuits, fluid delivery points, and/or envelope geometry. The design can be optimized to any appropriate application in terms of fuel entry and exit geometry, which can reduce the stress in mating components by optimizing assembly geometry. The design can also provide selective flow in terms of fuel flow direction (e.g., unidirectional or bidirectional, or biased directional flow). This design incorporates an undulating (oscillating) uni-body construction, allowing for planned management of thermal expansion within the component. It also incorporates many of the components used for external bracing, support, and mounting hardware, directly into the single piece component. This increases part structural strength and rigidity, while allowing design flexibility. This design also allows for integral mechanical attachment points for fuel nozzles or spray bars, allowing conventionally replaceable fuel nozzles, without requiring the removal and servicing of the entire augmenter unit.

In some embodiments, the profile of the manifold 2800 may be formed to promote fluid performance within the engine, which can reduce drag and increase engine performance. The profile may also be shaped as appropriate by the application to aid in engine air stream and fluid control. The part may also incorporate integral heat shielding and cooling features into the uni-body construction, as well as integral attachment points.

The manifold 2800 is implemented using a continuous manufacturing process during which the annular fluid passages are designed to be self-supporting. This makes it possible to eliminate a multitude of joints and separate components, and provides designers with opportunities to design the annular fuel passages in such a way as to increase the performance of them, as well as incorporate structural and mounting elements into the design of the component. Because designers are relieved of many of the restrictions of conventional tubing and machine components, fluid passages do not need to be straight or round in order to be produced. This allows designers to create fuel passages of entirely new geometries, which can modify and/or optimize the fluid behavior within the component. This also allows for more efficient use of the envelope geometry.

The manifold 2800 includes a one-piece, unitary housing 2810. The geometry of the housing 2810 defines a number of internal and external features. The housing 2810 includes a collection of outer surfaces 2812 and a collection of inner surfaces 2814.

The inner surfaces 2814 form tubular walls that define a collection of lumens 2820*a*-2820*d*. In some embodiments, the sizes, shapes, and locations of the lumens 2820*a*-2820*d* can be predetermined and configured to control the flow of fluid along the lumens 2820*a*-2820*d*. In the illustrated example, the lumens 2820*a*-2820*d* are arranged substantially parallel and coaxial to each other along an axial length 2802 of the housing 2810.

The inner surfaces 2814 form a collection of support structures 2824. The support structures 2824 are formed integrally with the housing 2810 as a single, seamless piece of material. The support structures 2824 are configured to support internal geometries of the manifold 2800, such as material of the housing 2810 that forms the walls of the lumens 2820*a*-2820*d*. In some embodiments, the support structures 2824 can be designed to perform multiple functions, such as defining lumens, positioning lumens relative to each other and/or within the interior of the housing 2810, acting as flow modifiers, acting as structural reinforcements, increasing or decreasing the rigidity of various regions, and/or combinations of these and any other appropriate structural functions within a fluid conduit.

The outer surfaces 2812 include a collection of fluid outlets 2830. The fluid outlets 2830 extend radially away from the housing 2810. In some embodiments, the sizes, shapes, and locations of the fluid outlets 2830 can be predetermined and configured to control the flow of fluid (e.g., air) across and around the housing 2810.

The fluid outlets 2830 are formed such that they defines a collection of fluid outlets 2840 as seamless outlet lumens within a portion of the fluid outlets 2830 and fluidly connect the lumens 2820*a*-2820*d* to an outer surface 2850 of the fluid outlets 2830. The fluid outlets 2830 are configured as fluid spray nozzles, and include throats, divergence tapers, and/or convergence tapers. The fluid outlets 2830 are formed with a seamless, predetermined geometry. In some embodiments, the fluid outlets 2830 can be formed with predetermined geometries that can modify the flow through and out of the fluid outlets 2830. For example, the fluid outlets 2830 can be formed with convergence, throat, and/or divergence geometries to urge fluid flows into streams, jets, sprays, atomizations, or any other appropriate fluid outflows.

Figure 30:
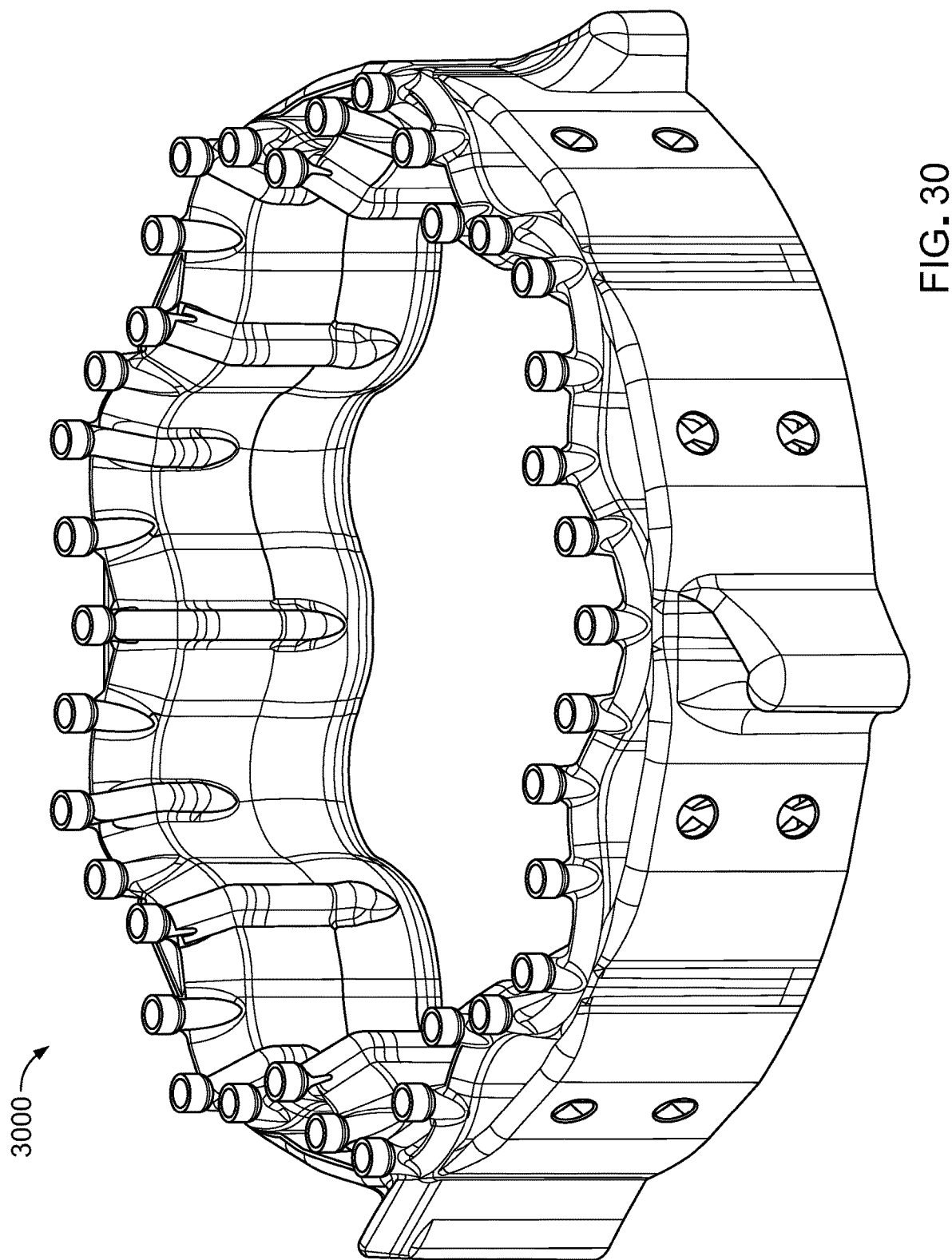
FIG. 30 is a perspective view of another integrated multi-passage manifold with vertical circuit stacking.
Figure 31:
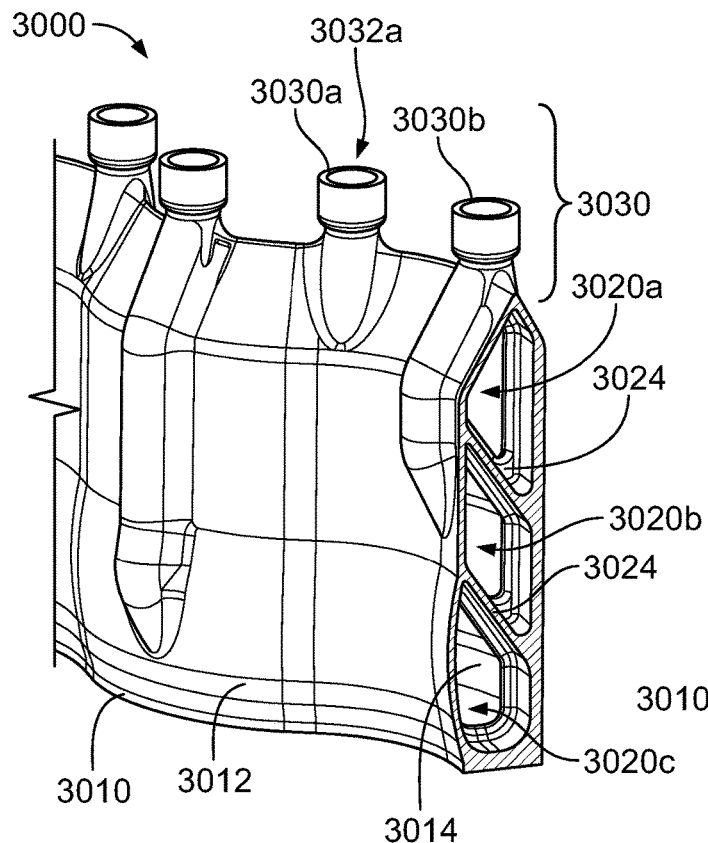
FIGS. 31-33 are a cross-sectional view of an example integrated multi passage manifold with vertical circuit stacking fuel outlet geometry.
Figure 32:
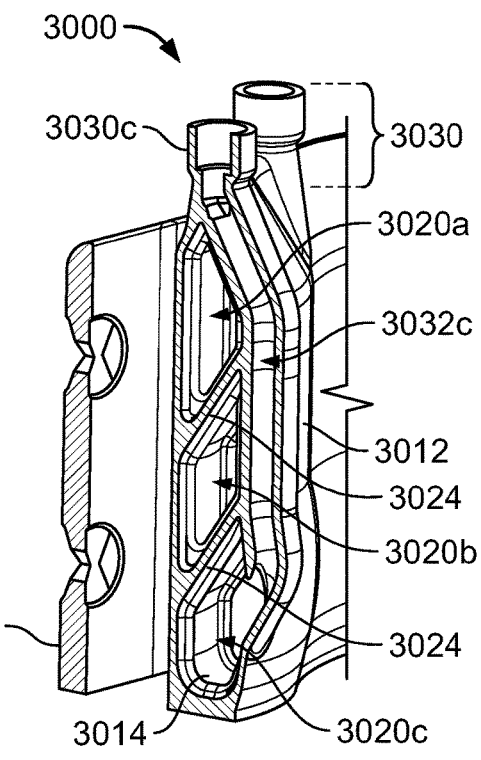
Figure 33:
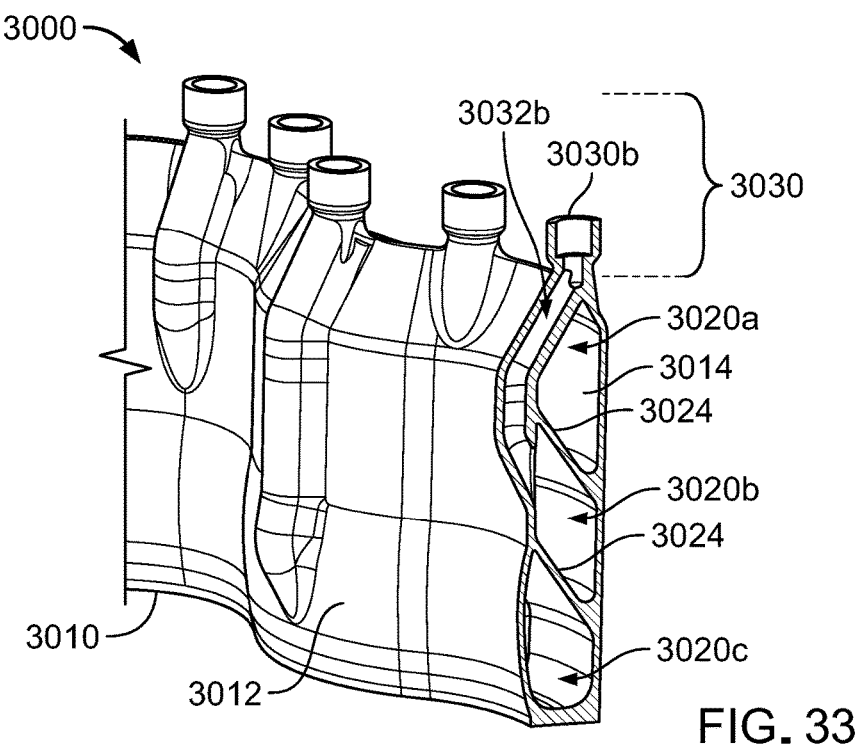

FIG. 30 is a perspective view of another integrated multi-passage manifold 3000 with vertical circuit stacking. FIGS. 31-33 are cross-sectional views of the manifold 3000. In some embodiments, the manifold 3000 can be the example fluid delivery component 160 of FIG. 1. The manifold 3000 is a one-piece, unitary component formed as a single piece of material without seams or joints.

Referring to FIGS. 31-33, the manifold 3000 includes a one-piece, unitary housing 3010. The geometry of the housing 3010 defines a number of internal and external features. The housing 3010 includes a collection of outer surfaces 3012 and a collection of inner surfaces 3014.

The inner surfaces 3014 form tubular walls that define a collection of lumens 3020*a*-3020*c* formed as rings. In some embodiments, the sizes, shapes, and locations of the lumens 3020*a*-3020*c* can be predetermined and configured to control the flow of fluid along the lumens 3020*a*-3020*c*. In the illustrated example, the lumens 3020*a*-3020*c* are arranged substantially coaxial to each other.

The inner surfaces 3014 form a collection of support structures 3024. The support structures 3024 are formed integrally with the housing 3010 as a single, seamless piece of material. The support structures 3024 are configured to support internal geometries of the manifold 3000, such as material of the housing 3010 that forms the walls of the lumens 3020*a*-3020*c*. In some embodiments, the support structures 3024 can be designed to perform multiple functions, such as defining lumens, positioning lumens relative to each other and/or within the interior of the housing 3010, acting as flow modifiers, acting as structural reinforcements, increasing or decreasing the rigidity of various regions, and/or combinations of these and any other appropriate structural functions within a fluid conduit.

The outer surfaces 3012 include a collection of fluid outlets 3030. The fluid outlets 3030 extend away from the housing 3010. In some embodiments, the sizes, shapes, and locations of the fluid outlets 3030 can be predetermined and configured to control the flow of fluid (e.g., air) across and around the housing 3010.

The housing also defines outlet lumens that fluidically connect the lumens 3020a-3020c to the fluid outlets 3030. In FIG. 31, the lumen 3020a is connected to a fluid outlet 3030a by an outlet lumen 3032a (not entirely visible). In FIGS. 31 and 33, the lumen 3020b is connected to a fluid outlet 3030b by an outlet lumen 3032b. In FIG. 32, the lumen 3020c is connected to a fluid outlet 3030c by an outlet lumen 3032c.

Figure 34:
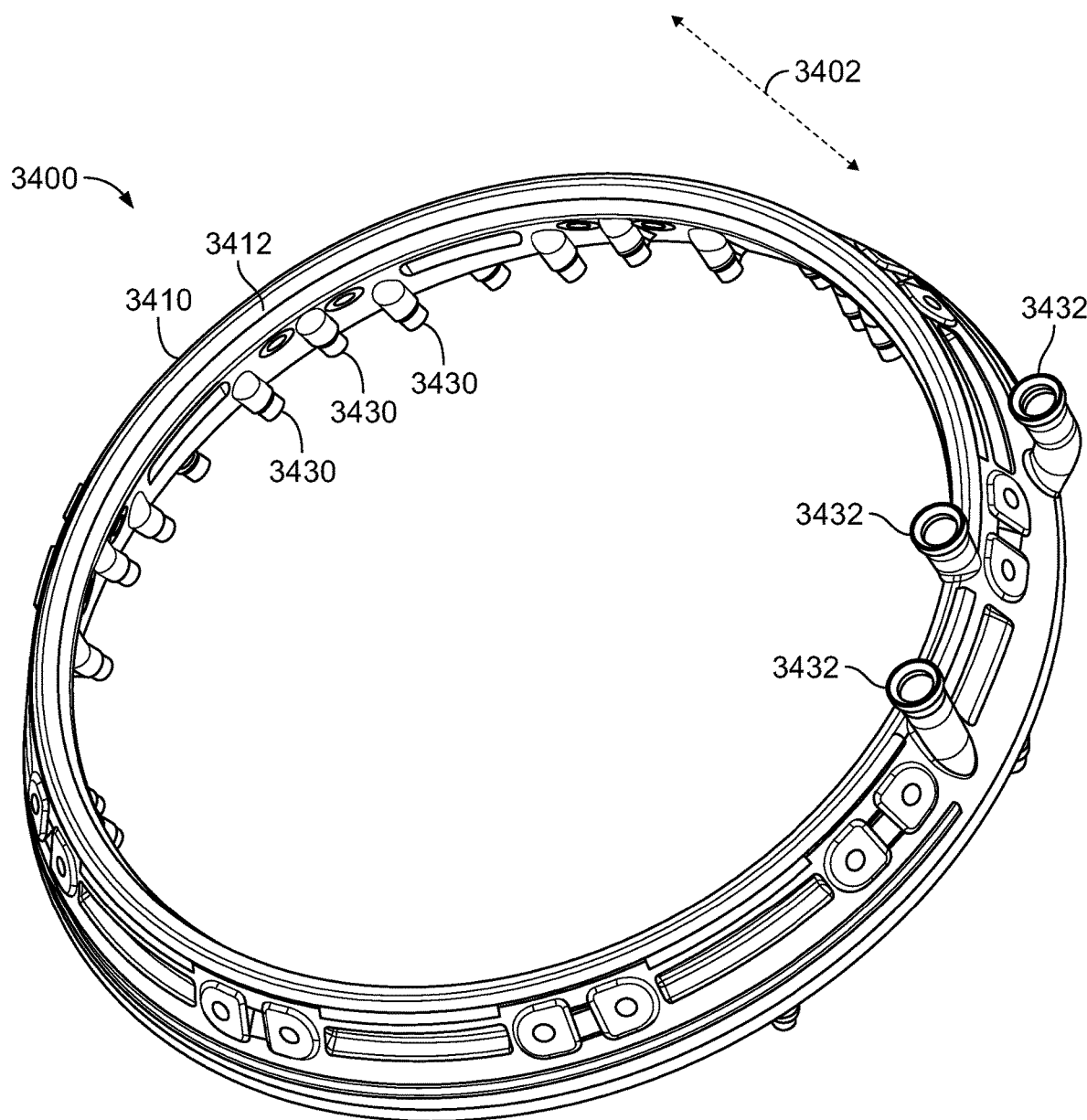
FIG. 34 is a perspective view of an example integrated multi passage manifold with inverted angle circuit stacking.
Figure 35:
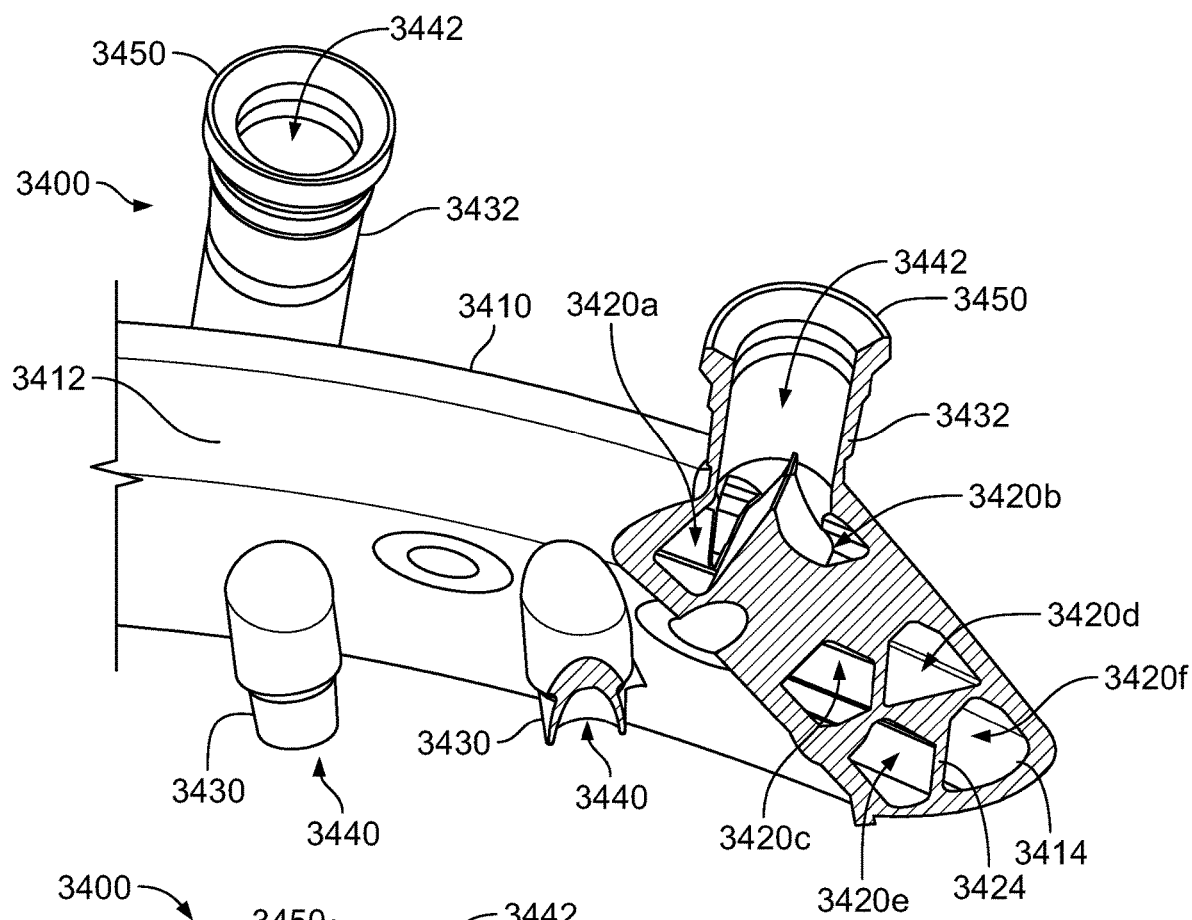
FIG. 35 is a sectional view of an example integrated multi passage manifold with inverted angle circuit stacking and fuel distribution divider.
Figure 36:
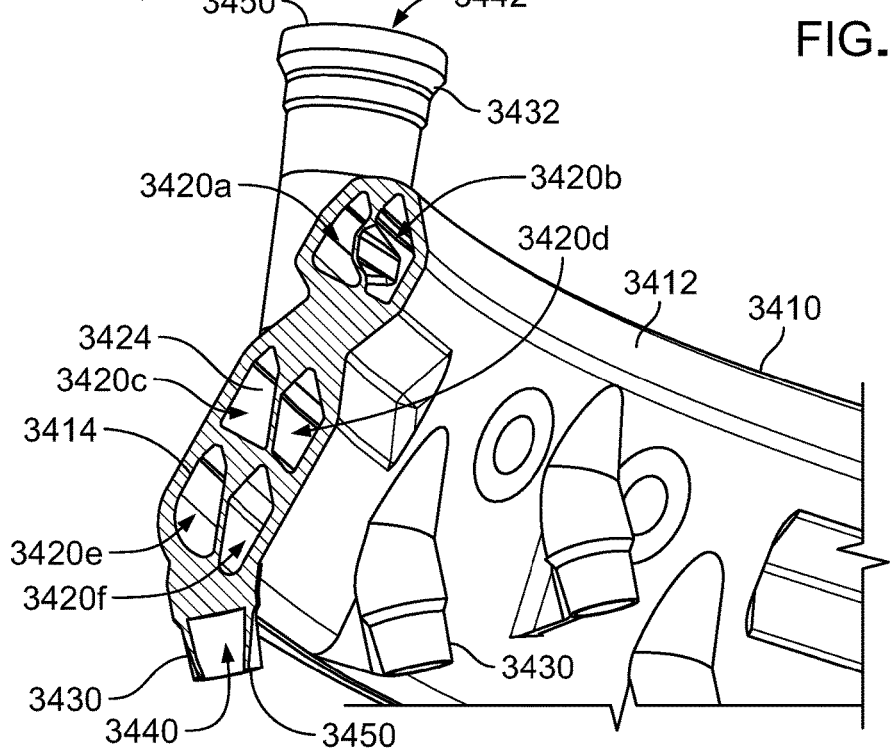
FIG. 36 is a sectional view of an example integrated multi passage manifold with inverted angle circuit stacking, with split fuel zones and conformal flow features.

FIG. 34 is a perspective view of an example integrated multi passage manifold 3400 with inverted angle circuit stacking. FIG. 35 is a sectional view of the manifold 3400 with inverted angle circuit stacking and fuel distribution divider. FIG. 36 is another sectional view of the manifold 3400 with inverted angle circuit stacking, with split fuel zones and conformal flow features. In some embodiments, the manifold 3400 can be the example fluid delivery component 160 of FIG. 1. The manifold 3400 is a one-piece, unitary component formed as a single piece of material without seams or joints.

The manifold 3400 includes a one-piece, unitary housing 3410. The geometry of the housing 3410 defines a number of internal and external features. The housing 3410 includes a collection of outer surfaces 3412 and a collection of inner surfaces 3414.

The inner surfaces 3414 form tubular walls that define a collection of lumens 3420a-3420f. In some embodiments, the sizes, shapes, and locations of the lumens 3420a-3420f can be predetermined and configured to control the flow of fluid along the lumens 3420a-3420f. In the illustrated example, the lumens 3420a-3420f are arranged substantially parallel and coaxial to each other along an axial length 3402 of the housing 3410.

The inner surfaces 3414 form a collection of support structures 3424. The support structures 3424 are formed integrally with the housing 3410 as a single, seamless piece of material. The support structures 3424 are configured to support internal geometries of the manifold 3400, such as material of the housing 3410 that forms the walls of the lumens 3420a-3420f. In some embodiments, the support structures 3424 can be designed to perform multiple functions, such as defining lumens, positioning lumens relative to each other and/or within the interior of the housing 3410, acting as flow modifiers, acting as structural reinforcements, increasing or decreasing the rigidity of various regions, and/or combinations of these and any other appropriate structural functions within a fluid conduit.

The outer surfaces 3412 include a collection of fluid outlets 3430. The fluid outlets 3430 extend radially away from the housing 3410. The outer surfaces 3412 also include a collection of fluid inlets 3432. The fluid inlets 3432 extend radially away from the housing 3410. In some embodiments, the sizes, shapes, and locations of the fluid outlets 3430 and the fluid inlets 3432 can be predetermined and configured to control the flow of fluid (e.g., air) across and around the housing 3410.

The fluid outlets 3430 are formed such that they define a collection of seamless outlet lumens 3440 within a portion of the fluid outlets 3430 and fluidly connect the lumens 3420a-3420f to an outer surface 3450 of the fluid outlets 3430. The fluid inlets 3432 are formed such that they define a collection of seamless inlet lumens 3442 within a portion of the fluid inlets 3432 and fluidly connect the lumens 3420a-3420f to an outer surface 3450 of the fluid inlets 3432.

The fluid outlets 3430 are configured as fluid spray nozzles, and include throats, divergence tapers, and/or convergence tapers. The fluid outlets 3430 are formed with a seamless, predetermined geometry. In some embodiments, the fluid outlets 3430 can be formed with predetermined geometries that can modify the flow through and out of the fluid outlets 3430. For example, the fluid outlets 3430 can be formed with convergence, throat, and/or divergence geometries to urge fluid flows into streams, jets, sprays, atomizations, or any other appropriate fluid outflows.

Figure 37:
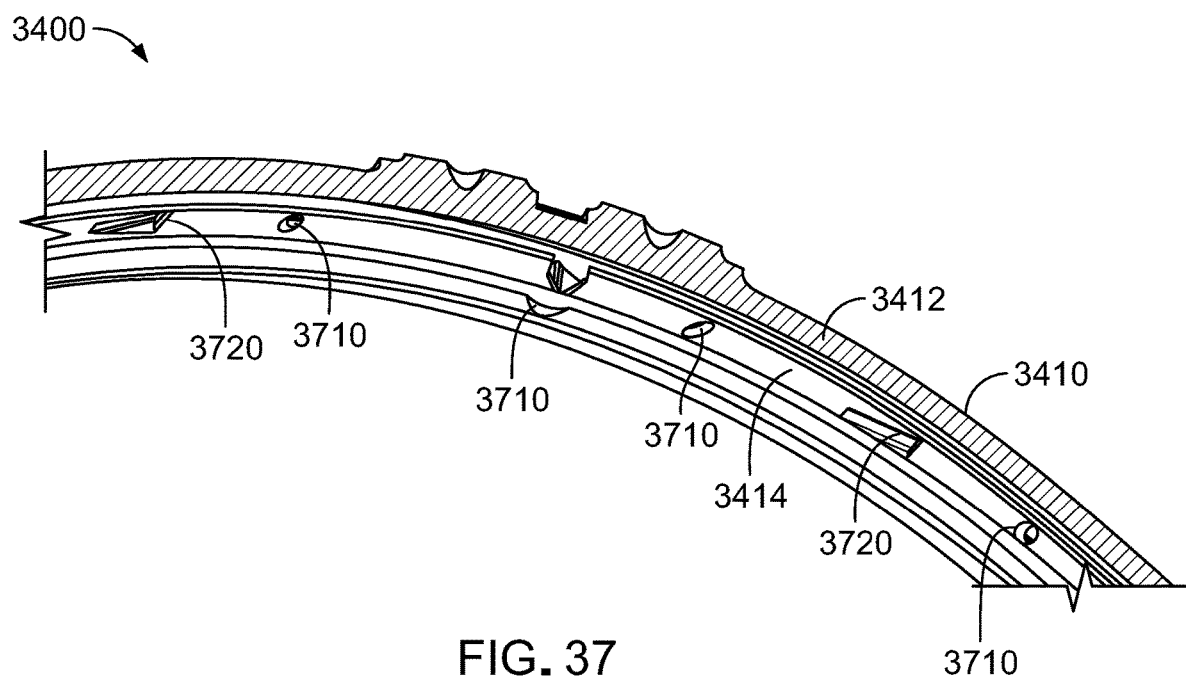
FIG. 37 is a sectional view of a partial zone of an example integrated multi passage manifold with inverted angle circuit stacking split fuel zones, conformal flow features, and pressure equalizing features.

FIG. 37 is a sectional view of a partial zone of the manifold 3400 with inverted angle circuit stacking split fuel zones, conformal flow features, and pressure equalizing features. The inner surface 3414 of the housing 3410 includes a collection of ellipsoid apertures 3710. The apertures 3710 are configured to equalize or otherwise modify the pressure between two sections of a fluid circuit (e.g., balance pressure between two lumens). The inner surface 3414 also includes a collection of flow modifiers 3720. The flow modifiers 3720 are configured to direct or otherwise modify fluid flow within a fluid circuit (e.g., lumen).

Figure 38:
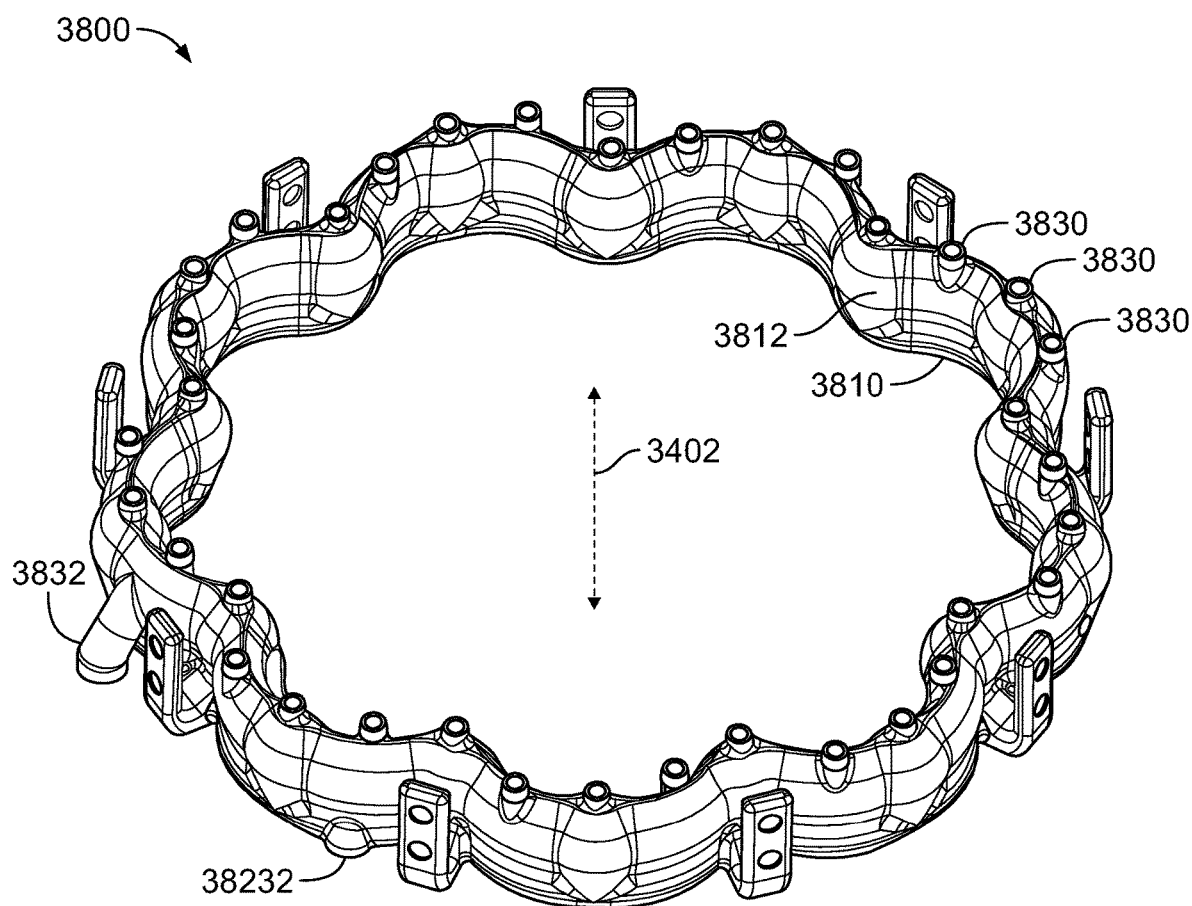
FIG. 38 is a perspective view of an example integrated multi passage manifold with y-frame type support.
Figure 39:
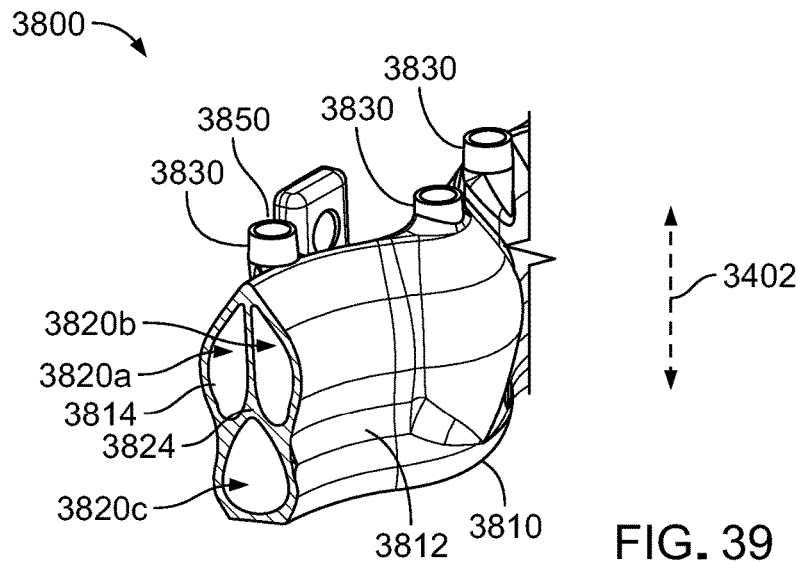
FIG. 39-41 are sectional views of an example integrated multi passage manifold with y frame type support.
Figure 40:
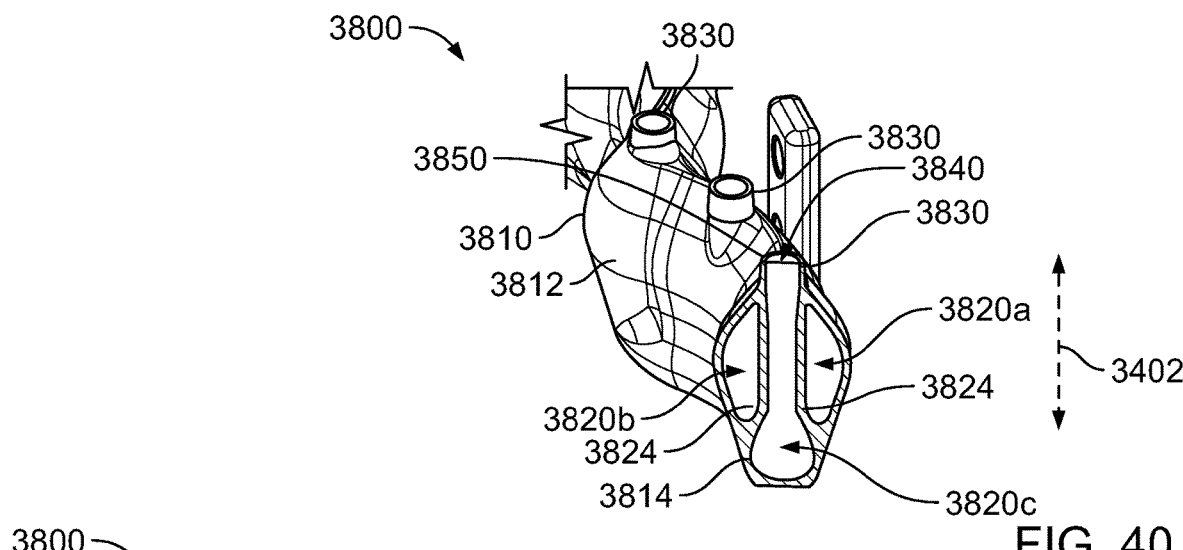
Figure 41:
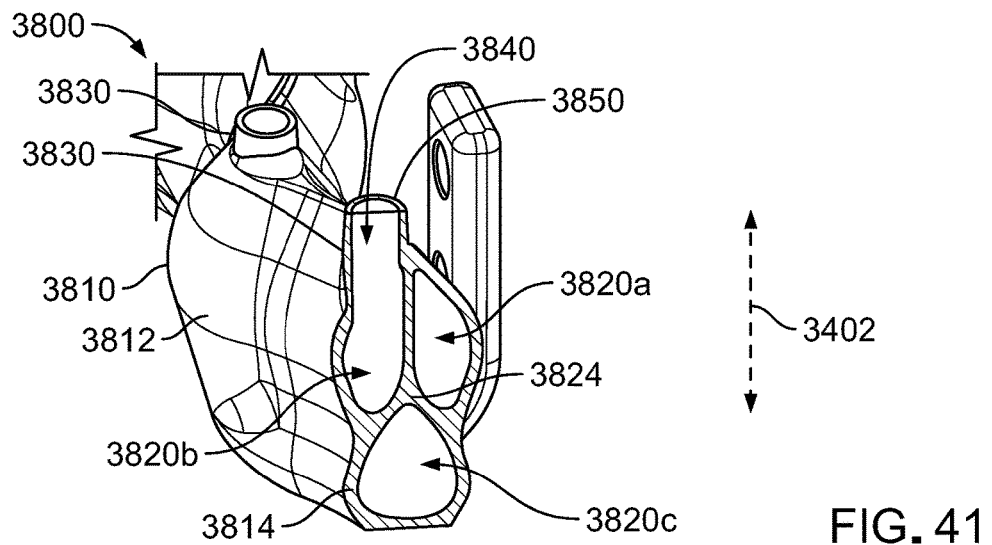

FIG. 38 is a perspective view of an example integrated multi passage manifold 3800 with y-frame type support. FIGS. 39-41 are sectional views of the manifold 3800. In some embodiments, the manifold 3800 can be the example fluid delivery component 160 of FIG. 1. The manifold 3800 is a one-piece, unitary component formed as a single piece of material without seams or joints.

The manifold 3800 includes a one-piece, unitary housing 3810. The geometry of the housing 3810 defines a number of internal and external features. The housing 3810 includes a collection of outer surfaces 3812 and a collection of inner surfaces 3814.

The inner surfaces 3814 form tubular walls that define a collection of lumens 3820a-3820c. In some embodiments, the sizes, shapes, and locations of the lumens 3820a-3820c can be predetermined and configured to control the flow of fluid along the lumens 3820a-3820c. In the illustrated example, the lumens 3820a-3820c are arranged substantially parallel and coaxial to each other along an axial length 3802 of the housing 3810.

The inner surfaces 3814 form a collection of support structures 3824. The support structures 3824 are formed integrally with the housing 3810 as a single, seamless piece of material. Generally speaking, the support structures 3824 are formed with a Y-shaped configuration that defines three spaces within the housing 3810. The support structures 3824 are configured to support internal geometries of the manifold 3800, such as material of the housing 3810 that forms the walls of the lumens 3820a-3820c. In some embodiments, the support structures 3824 can be designed to perform multiple functions, such as defining lumens, positioning lumens relative to each other and/or within the interior of the housing 3810, acting as flow modifiers, acting as structural reinforcements, increasing or decreasing the rigidity of various regions, and/or combinations of these and any other appropriate structural functions within a fluid conduit.

The outer surfaces 3812 include a collection of fluid outlets 3830. The fluid outlets 3830 extend radially away from the housing 3810. The outer surfaces 3812 also include a collection of fluid inlets 3832. The fluid inlets 3832 extend radially away from the housing 3810. In some embodiments, the sizes, shapes, and locations of the fluid outlets 3830 and the fluid inlets 3832 can be predetermined and configured to control the flow of fluid (e.g., air) across and around the housing 3810.

The fluid outlets 3830 are formed such that they define a collection of seamless outlet lumens 3840 within a portion of the fluid outlets 3830 and fluidly connect the lumens 3820a-3820c to an outer surface 3850 of the fluid outlets 3830. The fluid inlets 3832 are formed such that they define a collection of seamless inlet lumens (not shown) within a portion of the fluid inlets 3832 and fluidly connect the lumens 3820a-3820c to an outer surface 3850 of the fluid inlets 3832.

The fluid outlets 3830 are configured as fluid spray nozzles, and include throats, divergence tapers, and/or convergence tapers. The fluid outlets 3830 are formed with a seamless, predetermined geometry. In some embodiments, the fluid outlets 3830 can be formed with predetermined geometries that can modify the flow through and out of the fluid outlets 3830. For example, the fluid outlets 3830 can be formed with convergence, throat, and/or divergence geometries to urge fluid flows into streams, jets, sprays, atomizations, or any other appropriate fluid outflows.

Figure 42:
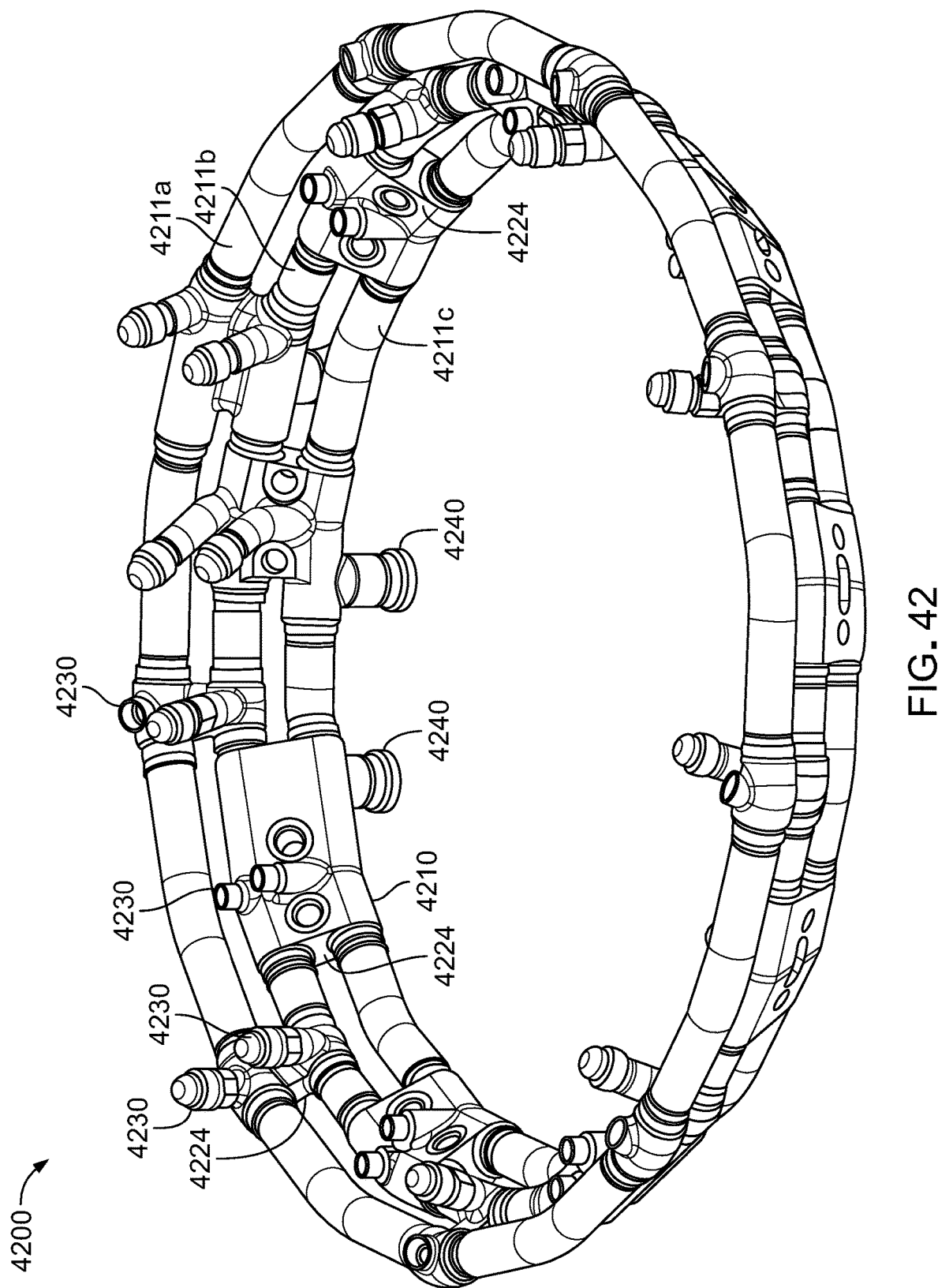
FIG. 42 is a perspective view of an example segmented manifold with conformal flow and removable features.

FIG. 42 is a perspective view of an example segmented manifold 4200 with conformal flow and removable features. FIG. 43 is a sectional view of the manifold 4200. In some embodiments, the manifold 4200 can be the example fluid delivery component 160 of FIG. 1. The manifold 4200 is a one-piece, unitary component formed as a single piece of material without seams or joints. In general, the manifold 4200 includes many of the features of the example manifolds 2800, 3000, 3400, and 3800 of FIGS. 28-41, with a different outer form. For example, a housing 4210 defines a collection of tubes 4211a-4211c that define fluid lumens (not shown) that fluidically connect a collection of fluid outlets 4230 to a collection of fluid inlets 4240 that are formed as integral parts of the housing 4210.

The inner surfaces 3414 form tubular walls that define a collection of lumens 3420a-3420f. In some embodiments, the sizes, shapes, and locations of the lumens 3420a-3420f can be predetermined and configured to control the flow of fluid along the lumens 3420a-3420f. In the illustrated example, the lumens 3420a-3420f are arranged substantially parallel and coaxial to each other along an axial length 3402 of the housing 3410.

The outer surfaces 4212 form a collection of support structures 4224. The support structures 4224 are formed integrally with the housing 4210 as a single, seamless piece of material. The support structures 4224 are configured to support the tubes 4211a-4211c. In some embodiments, the support structures 4224 can be designed to perform multiple functions, such as defining tubes, positioning tubes relative to each other and/or the rest of the housing 4210, acting as flow modifiers, acting as structural reinforcements, increasing or decreasing the rigidity of various regions, and/or combinations of these and any other appropriate structural functions within a fluid conduit.

FIG. 44 is a sectional view of an example segmented manifold inlet flow divider 4400. FIG. 45 is another sectional view of the divider 4400. The divider 4400 is a one-piece, unitary component formed as a single piece of material without seams or joints. In some embodiments, the divider 4400 can be a part of the example fluid delivery component 160 of FIG. 1.

The divider 4400 includes a housing 4410 that defines a fluid lumen 4420. The housing 4410 includes a fin 4415 that extends partly into the lumen 4420. The fin 4415 is formed to divert a portion of a fluid flow thought the lumen 4420 toward an outlet lumen 4430. The remainder of the fluid flow continues through the lumen 4420. As such, a portion of the fluid flow is divided between the lumen 4420 and the outlet lumen 4430.

FIG. 46 is a sectional view of an example segmented manifold 4600 with conformal flow features and removable features. The manifold 4600 is a one-piece, unitary component formed as a single piece of material without seams or joints. In some embodiments, the manifold 4600 can be a part of the example fluid delivery component 160 of FIG. 1. In some embodiments, the manifold 4600 can be the example manifold 4200 of FIG. 42.

The manifold 4600 includes a housing 4610 with an outer surface 4612. The housing 4610 includes a collection of couplers 4615 formed integrally with the housing 4610. The couplers 4615 include a collection of screw threads 4617 defined in the outer surface 4610. The screw threads 4617 are configured to mate with threads of a collection of removable connectors 4680. In some embodiments, the removable connectors 4680 can be part of a fluid coupling configured to couple the manifold 4600 to external fluid sources and/or fluid outlets (e.g., a spray bar).

Figure 47:
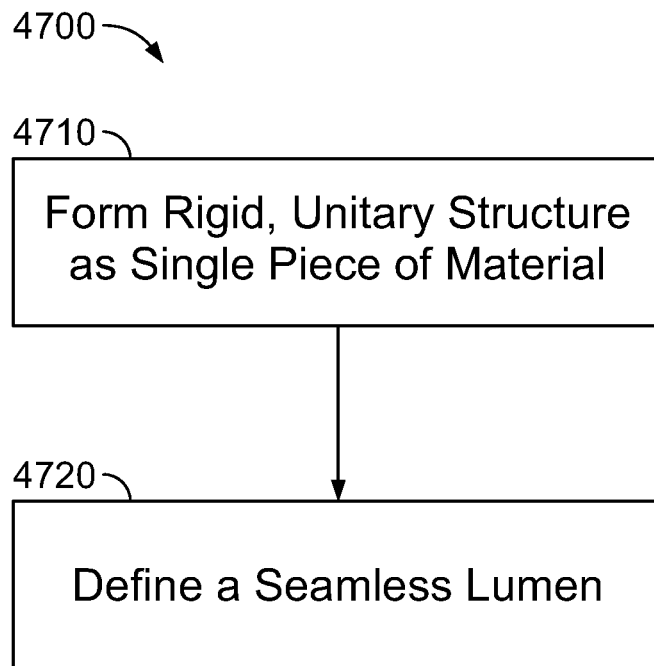
FIG. 47 is a flow diagram of an example process for manufacturing seamless, unitary, multi-lumen fluid distribution components.

FIG. 47 is a flow diagram of an example process 4700 for manufacturing seamless, unitary, multi-lumen fluid distribution components. In some implementations, the process 4700 can be performed by the example system 100 of FIG. 1.

At 4710, a substantially rigid, unitary structure is formed by additive manufacturing, as a single piece of material. For example, the AM system 140 can form the fluid delivery component 160.

At 4720, at least a first seamless lumen is defined within the unitary structure. For example, the lumen 420a can be defined by the inner surfaces 414 of the example spray bar 400 of FIG. 4.

In some implementations, the unitary structure can have a predetermined form. For example, the fluid delivery component 160 can be formed based on the design 122.

In some implementations, the first seamless lumen can be defined with a lengthwise radius of curvature. For example, the lumen 2020a of the example base 2000 of FIG. 21 is formed with a curve.

In some implementations, the first seamless lumen can be defined with a lengthwise varying cross-sectional area. For example, the lumen 2020a can, at various locations along the length of the example base 2000, expand to define the output lumen 2032.

In some implementations, the process 4700 can include defining, within the unitary structure, a second seamless lumen that is arranged substantially parallel to the first seamless lumen. For example, the lumen 420a is substantially parallel to the lumen 420b.

In some implementations, the process 4700 can include defining, within the unitary structure, a second seamless lumen, wherein the first seamless lumen and the second seamless lumen are defined substantially helical relative to each other. For example, the lumen 2020a and the lumen 2020f form a spiral or helix relative to each other.

In some implementations, the process 4700 can include defining a second seamless lumen at least partly within the first lumen. For example, the lumen 420a is formed partly within the lumen 420c. In some implementations, the process 4700 can include defining a collection of support structures defined by the unitary structure along the lengths of the first seamless lumen and the second seamless lumen, and configured to position the first lumen relative to the second lumen. For example, the support structures 424 can be formed to support the lumens 420b and 420c within the lumens 420a and 420d. In some implementations, the collection of support structures can be discontinuous along the lengths of the first lumen and the second lumen. For example, the support structure 424 includes the apertures 422, which are defined by lengthwise discontinuities along the inner surfaces 414.

In some implementations, the process 4700 can include defining, within the unitary structure, a second seamless lumen, and, defining, within the unitary structure, a third seamless lumen, wherein the first seamless lumen, the second seamless lumen, and the third seamless lumen are arranged as a non-intersecting weave. For example, three lumens can be formed together to have a braided, knotted, woven, or any other complex interactive configuration.

In some implementations, the first seamless lumen can be defined as a seamless loop. For example, the lumens 2820a-2020c of the example manifold 2800 of FIG. 28 are each formed as a seamless tubular loop.

In some implementations, the process 4700 can include forming at least one seamless fluid outlet seamlessly formed of the unitary structure, wherein the seamless fluid outlet defines a seamless outlet lumen in fluid communication with the first seamless lumen. For example, the outlet lumen 510 can be defined within the fin 430 to connect the lumen 420d to the surface 520.

In some implementations, the process 4700 can include forming at least one seamless fluid connector seamlessly formed of the unitary structure, wherein the seamless fluid connector defines a seamless connecting lumen in fluid communication with the first seamless lumen. For example, the base 1450 includes the collection of fluid connectors 1470a-1470c.

Figure 48:
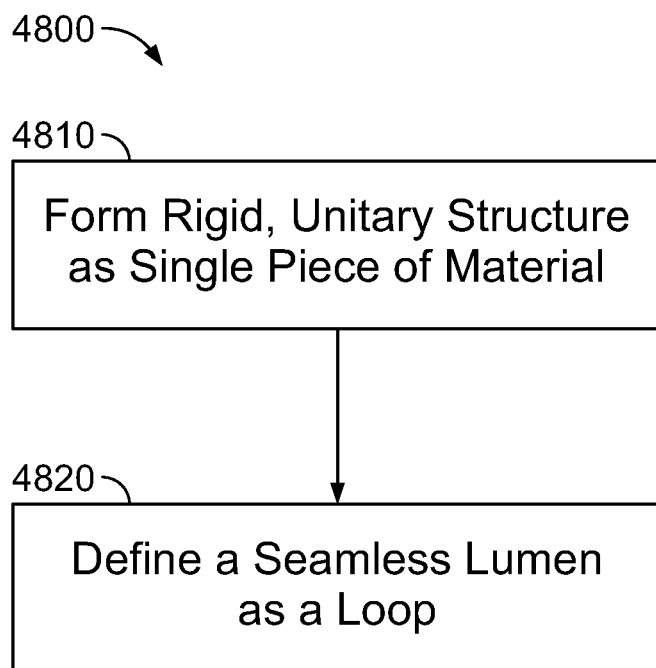
FIG. 48 is a flow diagram of another example process for manufacturing seamless, unitary, multi-lumen fluid distribution components.

FIG. 48 is a flow diagram of another example process 4800 for manufacturing seamless, unitary, multi-lumen fluid distribution components. In some implementations, the process 4800 can be performed by the example system 100 of FIG. 1.

At 4810, a substantially rigid, unitary structure is formed by additive manufacturing, as a single piece of material. For example, the AM system 140 can form the fluid delivery component 160.

At 4820, at least a first seamless lumen is defined as a first loop. For example, the lumen 2820a can be defined by the inner surfaces 2814 of the example manifold 2800 of FIG. 29.

In some implementations, the unitary structure can have a predetermined form. For example, the fluid delivery component 160 can be formed based on the design 122.

In some implementations, the first seamless lumen can be defined with a lengthwise varying cross-sectional area. For example, the lumen 3020b can, at various locations along the length of the example manifold 3000, expand to define the output lumen 3032b.

In some implementations, the process 4800 can include defining, within the unitary structure, a second seamless lumen as a second loop, wherein the second seamless lumen is defined substantially parallel to the first seamless lumen. For example, the lumen 2820a is substantially parallel to the lumen 2820b.

In some implementations, the process 4800 can include defining, within the unitary structure, a second seamless lumen as a second loop, wherein the second seamless lumen is defined substantially coaxial to the first seamless lumen. For example, the lumen 2820a is substantially coaxial to the lumen 2820b.

In some implementations, the process 4800 can include defining, within the unitary structure, a second seamless lumen as a second loop, wherein the first seamless lumen and the second seamless lumen are defined substantially helical relative to each other. For example, the lumen 2020a and the lumen 2020f form a spiral or helix relative to each other.

In some implementations, the process 4800 can include defining a second seamless lumen disposed at least partly within the first lumen. For example, the lumen 420a is formed partly within the lumen 420c.

In some implementations, the process 4800 can include defining a collection of support structures defined by the unitary structure along the lengths of the first seamless lumen and the second seamless lumen, and configured to position the first lumen relative to the second lumen. For example, the support structures 2824 can position the lumen 2820b relative to the lumens 2820a and 2820c.

In some implementations, the collection of support structures are discontinuous along the lengths of the first lumen and the second lumen. For example, the support structure 2824 is discontinuous about the loop of the example lumens 3020b and 3020a to define the outlet lumen 3032b.

In some implementations, the process 4800 can include defining, within the unitary structure, a second seamless lumen as a second loop, and defining, within the unitary structure, a third seamless lumen as a third loop, wherein the first seamless lumen, the second seamless lumen, and the third seamless lumen are arranged as a non-intersecting weave. For example, three lumens can be formed together to have a braided, knotted, woven, or any other complex interactive configuration.

In some implementations, the process 4800 can include forming at least one seamless fluid outlet seamlessly formed of the unitary structure, wherein the seamless fluid outlet defines a seamless outlet lumen in fluid communication with the first seamless lumen. For example, the outlet lumen 3440 can be defined within the outlet 3430 to connect the lumen 3220e to the surface 3450.

In some implementations, the process 4800 can include forming at least one seamless fluid connector seamlessly formed of the unitary structure, wherein the seamless fluid connector defines a seamless connecting lumen in fluid communication with the first seamless lumen. For example, the outlet lumen 3442 can be defined within the fluid inlet 3442 to connect the lumens 3220a and 3220b to the surface 3450.

Figure 49:
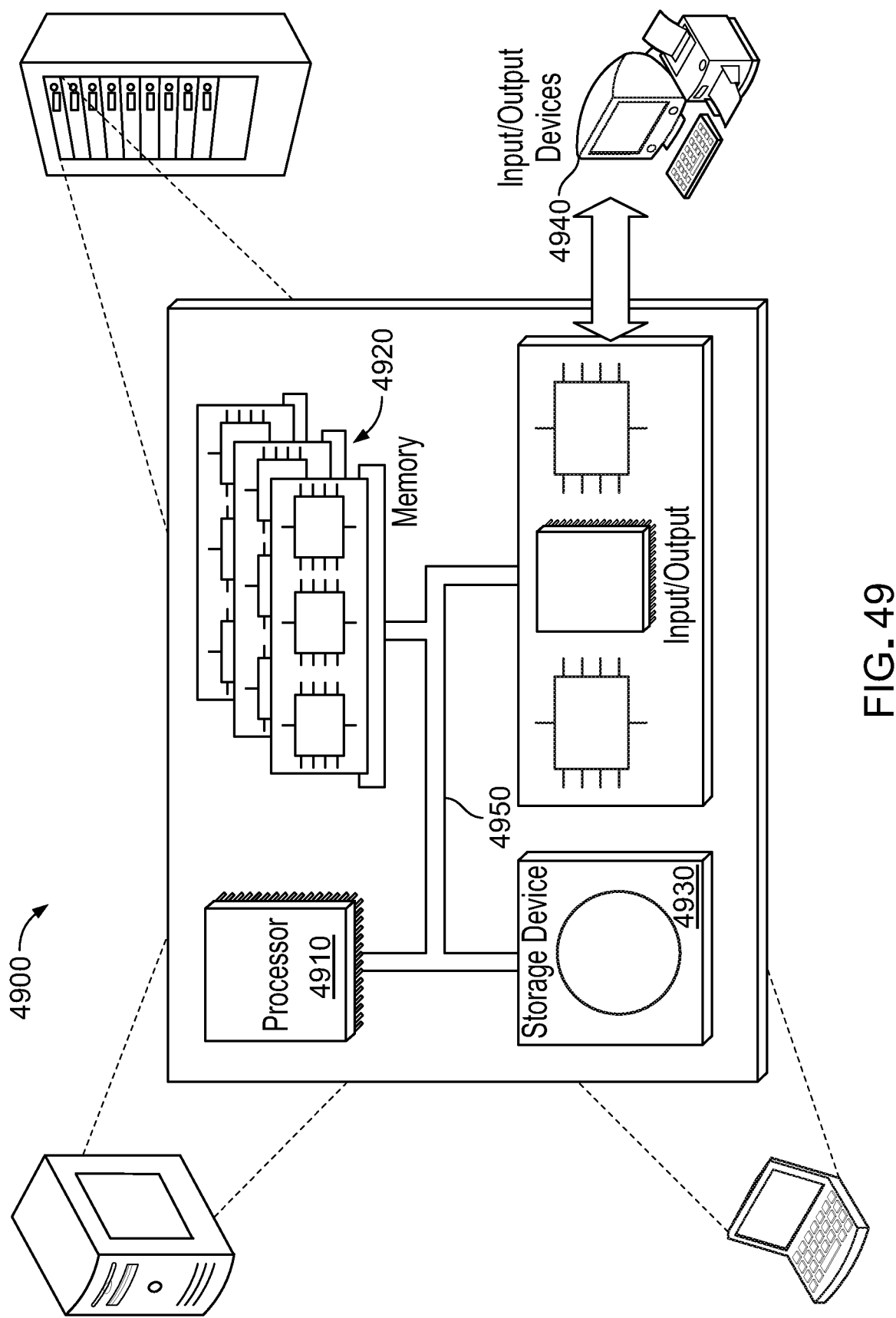
FIG. 49 is a schematic diagram of an example of a generic computer system 4900.

FIG. 49 is a schematic diagram of an example of a generic computer system 4900. The system 4900 can be used for the operations described in association with the method 300 according to one implementation. For example, the system 4900 may be included in either or all of the processing system 100 or the AM system 140 of FIG. 1.

The system 4900 includes a processor 4910, a memory 4920, a storage device 4930, and an input/output device 4940. Each of the components 4910, 4920, 4930, and 4940 are interconnected using a system bus 4950. The processor 4910 is capable of processing instructions for execution within the system 4900. In one implementation, the processor 4910 is a single-threaded processor. In another implementation, the processor 4910 is a multi-threaded processor. The processor 4910 is capable of processing instructions stored in the memory 4920 or on the storage device 4930 to display graphical information for a user interface on the input/output device 4940.

The memory 4920 stores information within the system 4900. In one implementation, the memory 4920 is a computer-readable medium. In one implementation, the memory 4920 is a volatile memory unit. In another implementation, the memory 4920 is a non-volatile memory unit.

The storage device 4930 is capable of providing mass storage for the system 4900. In one implementation, the storage device 4930 is a computer-readable medium. In various different implementations, the storage device 4930 may be a floppy disk device, a hard disk device, an optical disk device, or a tape device.

The input/output device 4940 provides input/output operations for the system 4900. In one implementation, the input/output device 4940 includes a keyboard and/or pointing device. In another implementation, the input/output device 4940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A fuel delivery component, comprising:
a substantially rigid, unitary structure formed as a single piece of material;
at least a first seamless lumen defined by the unitary structure as a first loop; and
at least one seamless fluid outlet defined by the unitary structure, wherein the fluid outlet defines a seamless outlet lumen in fluid communication with the first seamless lumen.

2. The fuel delivery component of claim 1, wherein the unitary structure defines the first seamless lumen to have a lengthwise varying cross-sectional area.

3. The fuel delivery component of claim 1, further comprising a second seamless lumen defined by the unitary structure as a second loop, wherein the second seamless lumen is defined substantially parallel to the first seamless lumen.

4. The fuel delivery component of claim 1, further comprising a second seamless lumen defined by the unitary structure as a second loop, wherein the second seamless lumen is defined substantially coaxial to the first seamless lumen.

5. The fuel delivery component of claim 1, further comprising a second seamless lumen defined by the unitary structure as a second loop, wherein the first seamless lumen and the second seamless lumen are defined substantially helical relative to each other.

6. The fuel delivery component of claim 1, further comprising a second seamless lumen defined by the unitary structure as a second loop and a third seamless lumen defined by the unitary structure as a third loop, wherein the second seamless lumen and the third seamless lumen are arranged as a non-intersecting weave with the first seamless lumen.

7. The fuel delivery component of claim 1, further comprising a second seamless lumen defined by the unitary structure and disposed within the first seamless lumen.

8. The fuel delivery component of claim 7, further comprising a plurality of support structures defined by the unitary structure along the lengths of the first seamless lumen and the second seamless lumen, and configured to position the first seamless lumen relative to the second seamless lumen.

9. The fuel delivery component of claim 8, wherein the plurality of support structures are discontinuous along the lengths of the first seamless lumen and the second seamless lumen.

10. The fuel delivery component of claim 1, wherein the seamless fluid outlet is configured as a fluid spray nozzle comprising a throat having a first cross-sectional area and comprising at least one of (1) a convergence taper defined between the seamless lumen and the throat and having a second cross-section that is larger than the first cross-section, and (2) a divergence taper defined between the throat and an outer face of the fluid outlet and having a third cross-section that is larger than the first cross-section.

11. The fuel delivery component of claim 1, further comprising one or more fluid connectors defined by the unitary structure, wherein each of the fluid connectors comprises a fluid fitting configured to couple the fluid connector to an external fluid conduit and defines a seamless connecting lumen in fluid communication with the first seamless lumen.

12. A fuel delivery component, comprising:
a substantially rigid, unitary structure formed as a single piece of material;
at least a first seamless lumen defined by the unitary structure as a first loop;
a second seamless lumen defined by the unitary structure as a second loop; and
a third seamless lumen defined by the unitary structure as a third loop;
wherein the second seamless lumen and the third seamless lumen are arranged as a non-intersecting weave with the first seamless lumen.

13. A fuel delivery component, comprising:
a substantially rigid, unitary structure formed as a single piece of material; and
at least a first seamless lumen defined by the unitary structure as a first loop; and
second seamless lumen defined by the unitary structure disposed at least partly within the first seamless lumen.

14. A fuel delivery component, comprising:
a substantially rigid, unitary structure formed as a single piece of material;
at least a first seamless lumen defined by the unitary structure as a first loop; and
one or more fluid connectors defined by the unitary structure, wherein each of the fluid connectors comprises a fluid fitting configured to couple the fluid connector to an external fluid conduit and defines a seamless connecting lumen in fluid communication with the first seamless lumen.

* * * * *

UNITED STATES PATENT AND TRADEMARK OFFICE
CERTIFICATE OF CORRECTION

| | |
|---|---|
| PATENT NO. | : 11,187,154 B2 |
| APPLICATION NO. | : 16/352321 |
| DATED | : November 30, 2021 |
| INVENTOR(S) | : Broome et al. |

It is certified that error appears in the above-identified patent and that said Letters Patent is hereby corrected as shown below:

In the Specification

Column 16, Line 50, after "bar" insert -- . --.

Signed and Sealed this
Nineteenth Day of July, 2022

Katherine Kelly Vidal
*Director of the United States Patent and Trademark Office*